(12) United States Patent
Daley, III

(10) Patent No.: US 8,830,666 B2
(45) Date of Patent: *Sep. 9, 2014

(54) BAG COMPUTER SLIDING DEPLOYMENT DISPLAY PANEL ASSEMBLY

(76) Inventor: Charles A. Daley, III, Rawai (TH)

( * ) Notice: Subject to any disclaimer, the term of this patent is extended or adjusted under 35 U.S.C. 154(b) by 341 days.

This patent is subject to a terminal disclaimer.

(21) Appl. No.: 13/135,446

(22) Filed: Jul. 7, 2011

(65) Prior Publication Data

US 2011/0267754 A1    Nov. 3, 2011

Related U.S. Application Data

(63) Continuation-in-part of application No. 12/927,884, filed on Nov. 30, 2010, now Pat. No. 8,605,415.

(60) Provisional application No. 61/457,761, filed on May 31, 2011.

(51) Int. Cl.
*G06F 1/16* (2006.01)
(52) U.S. Cl.
CPC .................................. *G06F 1/1628* (2013.01)
USPC ...................................................... 361/679.03
(58) Field of Classification Search
USPC ..................................................... 361/679.03
See application file for complete search history.

(56) References Cited

U.S. PATENT DOCUMENTS

| | | | |
|---|---|---|---|
| 5,217,119 A * | 6/1993 | Hollingsworth | 206/583 |
| 5,222,642 A * | 6/1993 | Solarz | 224/191 |
| 5,445,266 A * | 8/1995 | Prete et al. | 206/320 |
| 5,494,157 A * | 2/1996 | Golenz et al. | 206/320 |
| 5,678,666 A * | 10/1997 | Shyr et al. | 190/102 |
| 5,774,338 A * | 6/1998 | Wessling, III | 361/730 |
| 5,887,723 A * | 3/1999 | Myles et al. | 206/760 |
| 5,887,777 A * | 3/1999 | Myles et al. | 224/578 |
| 5,908,147 A * | 6/1999 | Chuang | 224/607 |
| 6,105,764 A * | 8/2000 | Scicluna et al. | 206/320 |
| 6,161,738 A * | 12/2000 | Norris | 224/153 |
| 6,167,413 A * | 12/2000 | Daley, III | 708/139 |
| 6,283,299 B1 * | 9/2001 | Lee | 206/760 |
| 6,393,745 B1 * | 5/2002 | Miki | 40/586 |
| 6,597,568 B2 * | 7/2003 | Ryder | 361/679.55 |
| 6,685,016 B2 * | 2/2004 | Swaim et al. | 206/320 |
| 6,763,942 B1 * | 7/2004 | Yeh | 206/320 |
| 6,769,588 B2 * | 8/2004 | Zheng | 224/576 |
| 6,956,614 B1 * | 10/2005 | Quintana et al. | 348/373 |
| 6,962,277 B2 * | 11/2005 | Quintana et al. | 224/262 |
| 7,265,970 B2 * | 9/2007 | Jordan | 361/679.27 |

(Continued)

FOREIGN PATENT DOCUMENTS

JP    2004097801 A  *  4/2004  ............ A45C 11/00

*Primary Examiner* — Lisa Lea Edmonds

(57) ABSTRACT

The disclosed invention is a bag with a computer display panel attached to it. The display panel remains attached to the bag by a retainer while it pivots near the top front corner of the bag so that the operator/wearer of the bag can view the display. To move from an operating to storage position, the display panel pivots upward into a vertical position and slides downward into a pocket-like holder on the bag front. The retainer attaches to the bag inside the holder. For maintaining an angular position of the display panel relative to the bag front when in operation, the display panel includes a prop extending to the holder front. The prop presses against the holder front while the display panel is supported by the retainer. A computing unit panel, electrically connected to the display panel, may be attached to the inside front of the bag.

62 Claims, 19 Drawing Sheets

(56) References Cited

U.S. PATENT DOCUMENTS

| | | | |
|---|---|---|---|
| 7,821,779 B2* | 10/2010 | Daley, III | 361/679.02 |
| 7,876,558 B2* | 1/2011 | Daley, III | 361/679.55 |
| 7,881,048 B2* | 2/2011 | Daley, III | 361/679.03 |
| 7,889,496 B2* | 2/2011 | Daley, III | 361/679.55 |
| 7,894,179 B2* | 2/2011 | Daley, III | 361/679.03 |
| 7,974,081 B2* | 7/2011 | Daley, III | 361/679.03 |
| 7,978,464 B2* | 7/2011 | Daley, III | 361/679.02 |
| 8,014,138 B2* | 9/2011 | Daley, III | 361/679.03 |
| 8,094,440 B2* | 1/2012 | Daley, III | 361/679.03 |
| 8,125,770 B2* | 2/2012 | Daley, III | 361/679.03 |
| 8,194,398 B2* | 6/2012 | Daley, III | 361/679.03 |
| 8,467,176 B2* | 6/2013 | Daley, III | 361/679.03 |
| 2004/0134813 A1* | 7/2004 | Domotor | 206/320 |
| 2005/0000843 A1* | 1/2005 | Zheng | 206/457 |
| 2005/0011920 A1* | 1/2005 | Feng | 224/275 |
| 2005/0045673 A1* | 3/2005 | Godshaw et al. | 224/153 |
| 2005/0103815 A1* | 5/2005 | Lee et al. | 224/275 |
| 2006/0042996 A1* | 3/2006 | Picot et al. | 206/586 |
| 2006/0113203 A1* | 6/2006 | Daley | 206/320 |
| 2006/0113213 A1* | 6/2006 | Daley, III | 206/576 |
| 2006/0144663 A1* | 7/2006 | Gullen et al. | 190/110 |
| 2006/0163303 A1* | 7/2006 | Trutanich | 224/576 |
| 2007/0151881 A1* | 7/2007 | Zheng | 206/320 |
| 2007/0199844 A1* | 8/2007 | Daley, III | 206/320 |
| 2007/0199851 A1* | 8/2007 | Yau | 206/472 |
| 2007/0201201 A1* | 8/2007 | Daley, III | 361/683 |
| 2008/0161753 A1* | 7/2008 | Gillespie et al. | 604/65 |
| 2008/0192421 A1* | 8/2008 | Daley | 361/681 |
| 2008/0237250 A1* | 10/2008 | Swansey | 220/756 |
| 2008/0273298 A1* | 11/2008 | Daley | 361/683 |
| 2008/0289886 A1* | 11/2008 | Burkitt | 178/18.03 |
| 2009/0009476 A1* | 1/2009 | Daley, III | 345/168 |
| 2009/0009938 A1* | 1/2009 | Daley, III | 361/680 |
| 2009/0027632 A1* | 1/2009 | Choi | 353/98 |
| 2009/0046416 A1* | 2/2009 | Daley, III | 361/679.55 |
| 2009/0107877 A1* | 4/2009 | Daley, III | 206/576 |
| 2009/0107878 A1* | 4/2009 | Daley, III | 206/576 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |
| 2010/0050485 A1* | 3/2010 | Forte et al. | 40/1.5 |
| 2010/0193384 A1* | 8/2010 | Daley, III | 206/320 |
| 2010/0219221 A1* | 9/2010 | Zheng | 224/576 |
| 2010/0220434 A1* | 9/2010 | Daley, III | 361/679.27 |
| 2010/0256561 A1* | 10/2010 | Gillespie et al. | 604/151 |
| 2011/0032669 A1* | 2/2011 | Daley, III | 361/679.03 |
| 2011/0051349 A1* | 3/2011 | Daley, III | 361/679.27 |
| 2011/0051362 A1* | 3/2011 | Daley, III | 361/679.55 |
| 2011/0102992 A1* | 5/2011 | Daley, III | 361/679.03 |
| 2011/0164366 A1* | 7/2011 | Daley, III | 361/679.03 |
| 2011/0267754 A1* | 11/2011 | Daley, III | 361/679.03 |
| 2011/0304965 A1* | 12/2011 | Daley, III | 361/679.03 |
| 2011/0304970 A1* | 12/2011 | Daley, III | 361/679.26 |
| 2012/0008261 A1* | 1/2012 | Daley, III | 361/679.01 |
| 2012/0106055 A1* | 5/2012 | Daley, III | 361/679.03 |
| 2012/0275102 A1* | 11/2012 | Daley, III | 361/679.03 |

\* cited by examiner

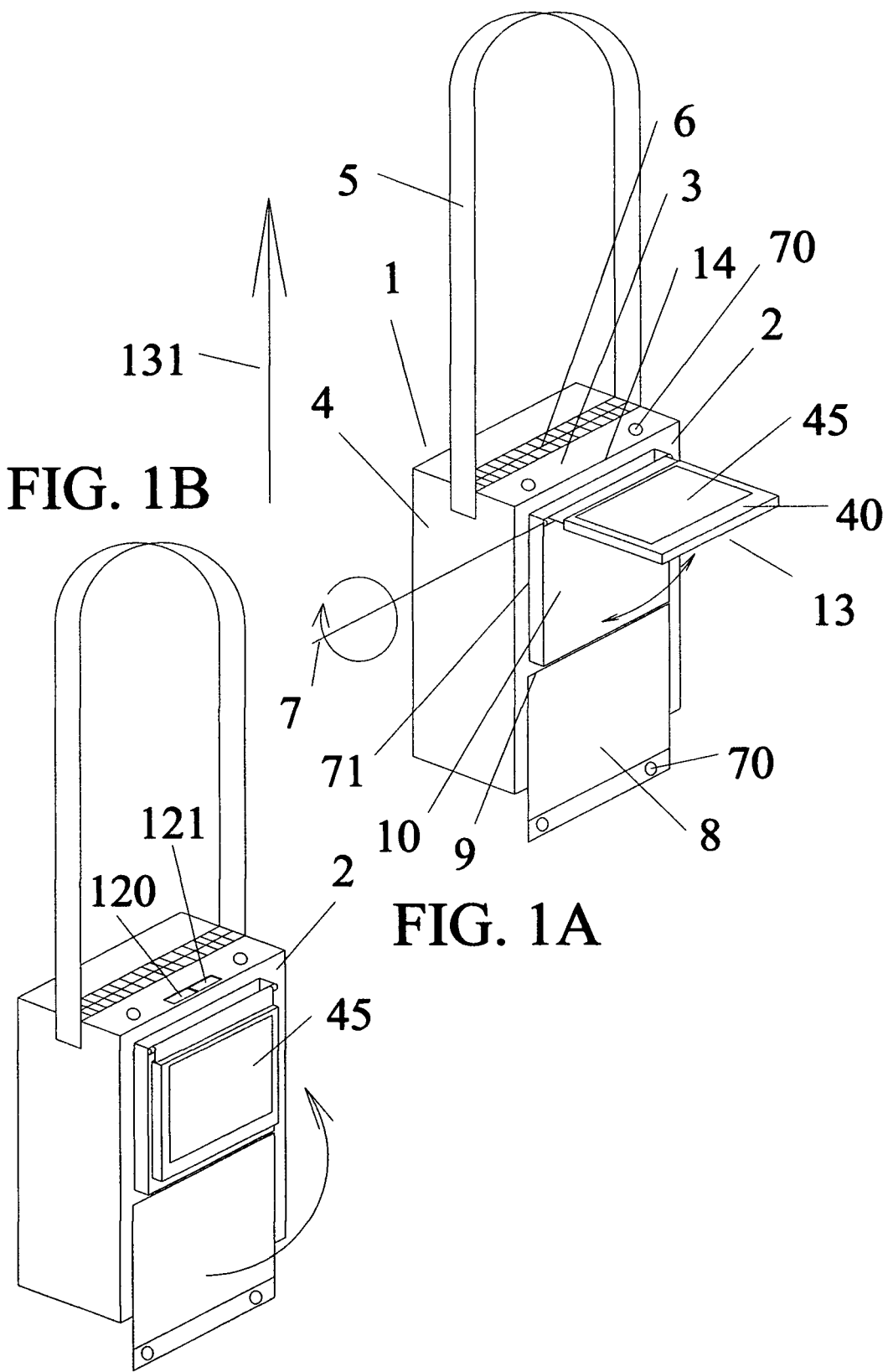

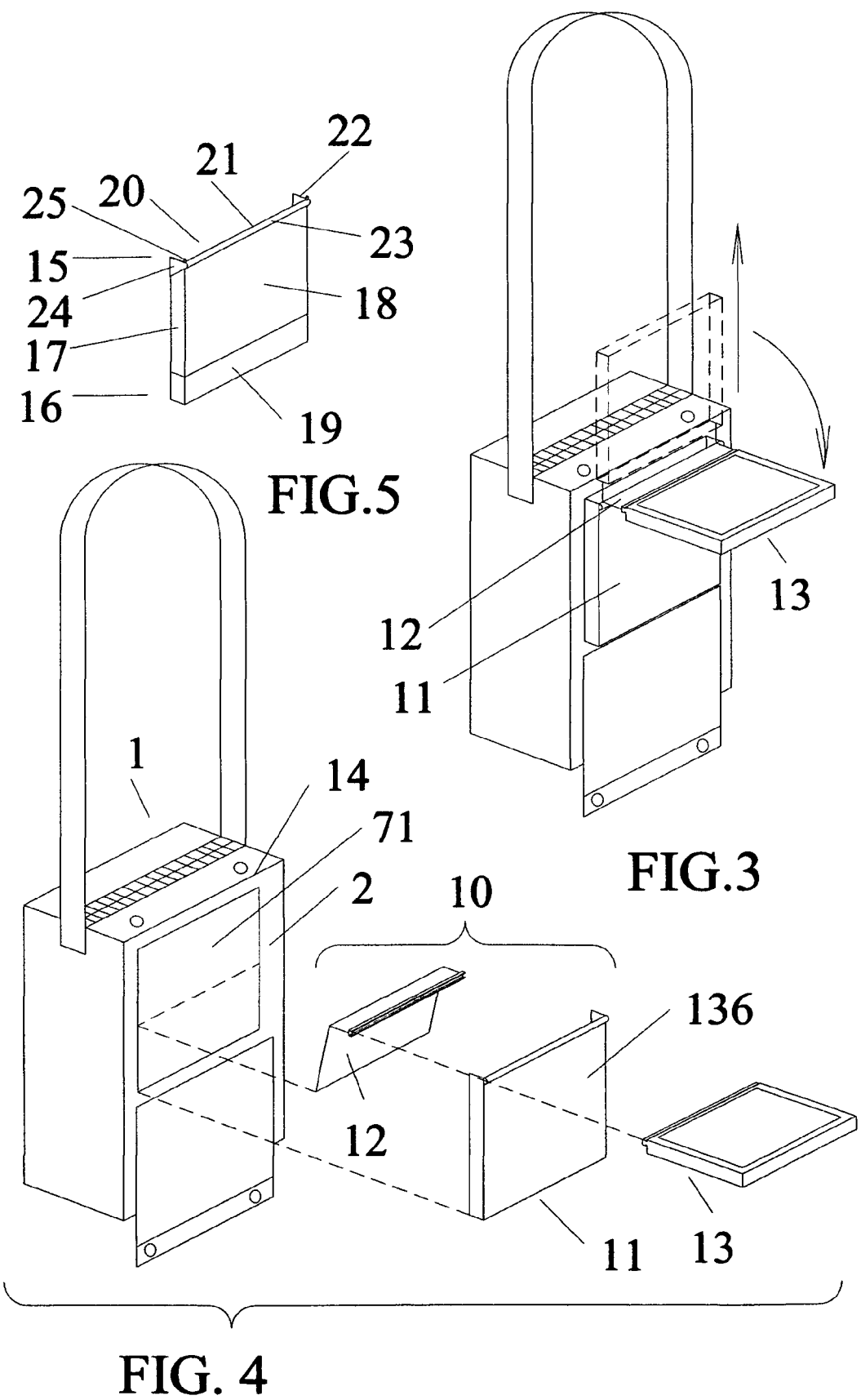

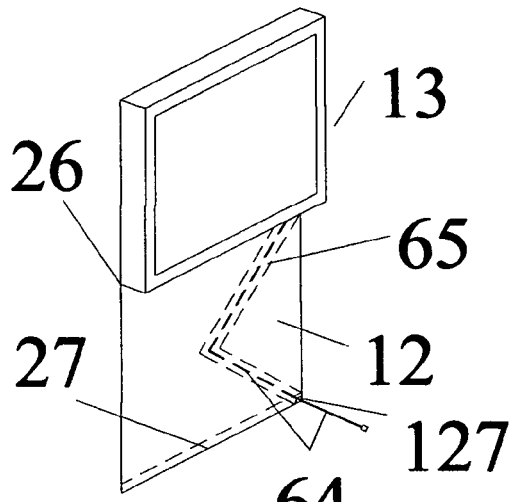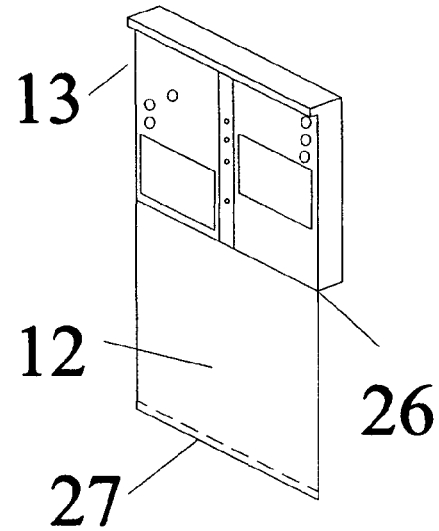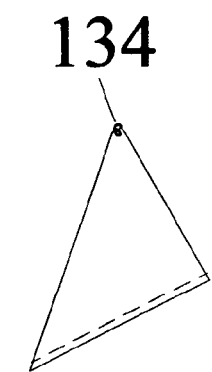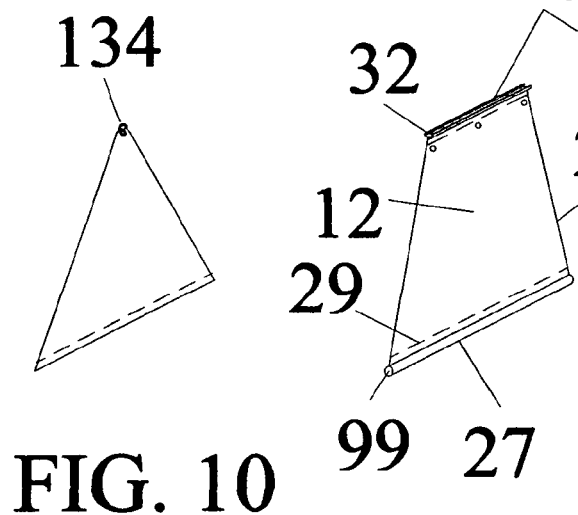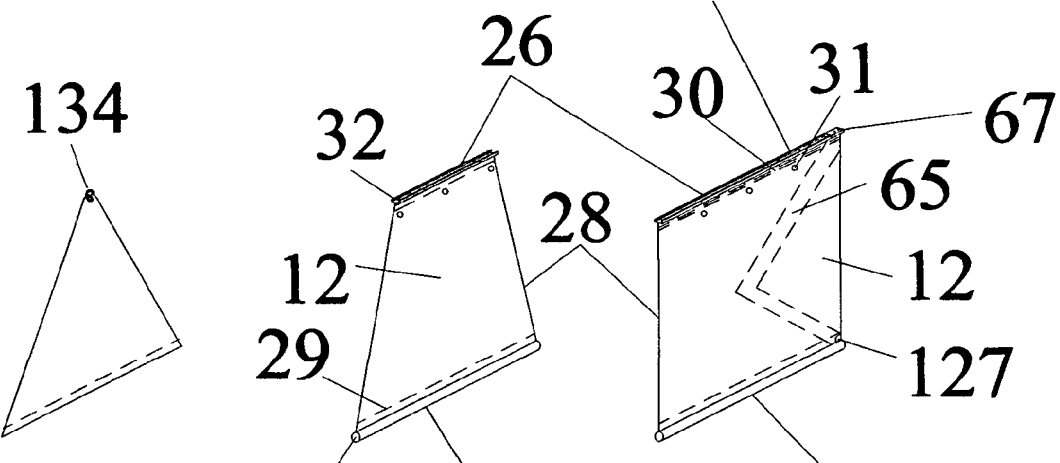
FIG. 6
FIG. 7
FIG. 10
FIG. 9
FIG. 8

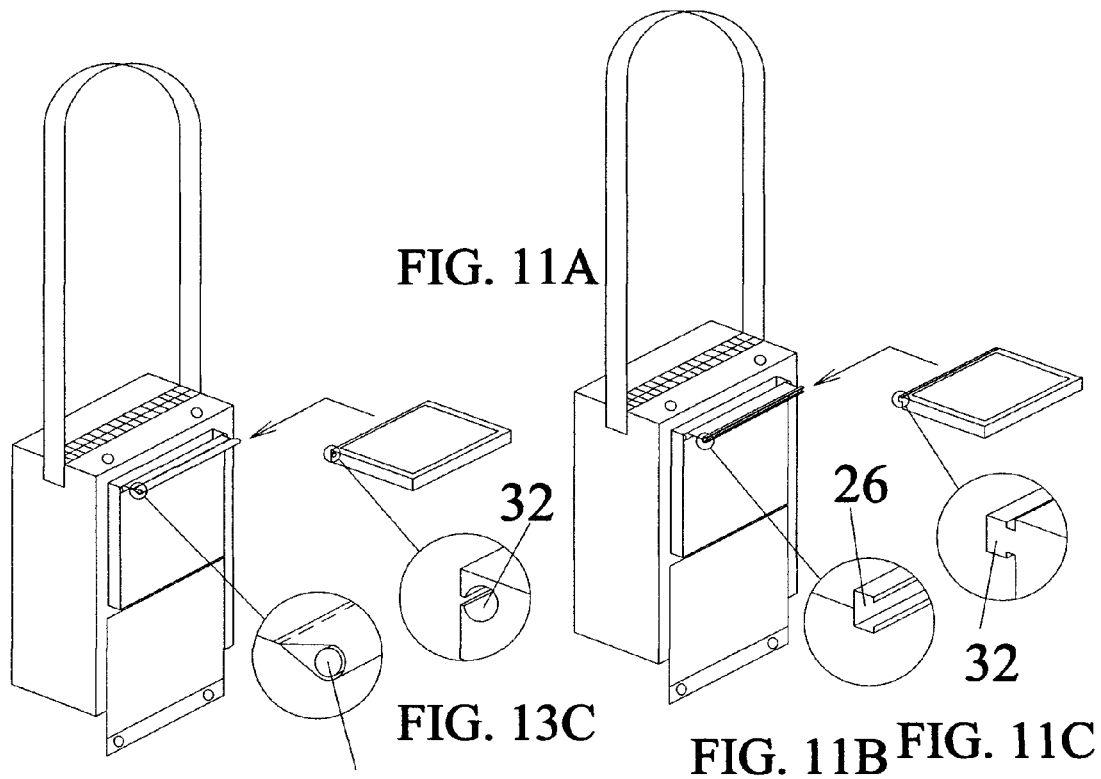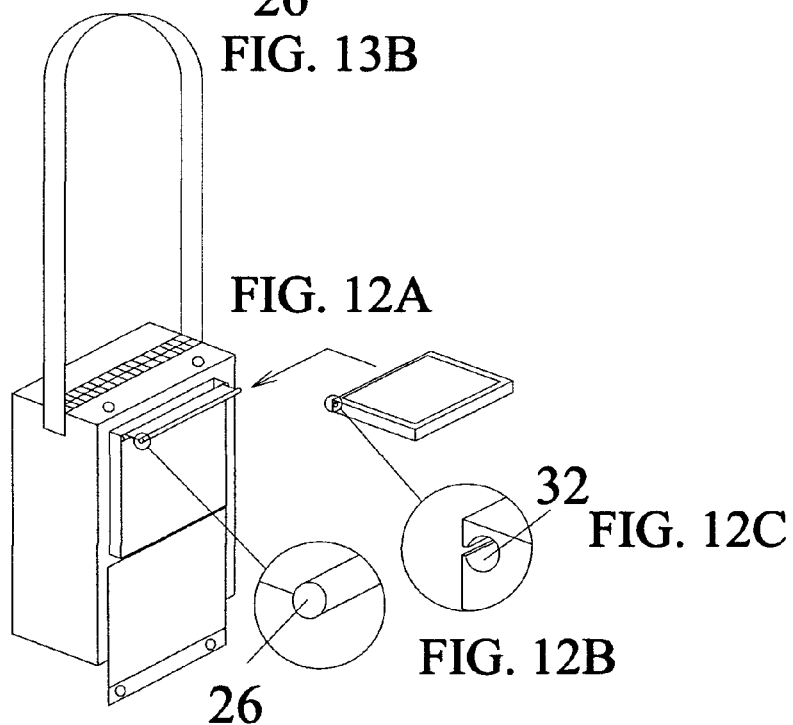

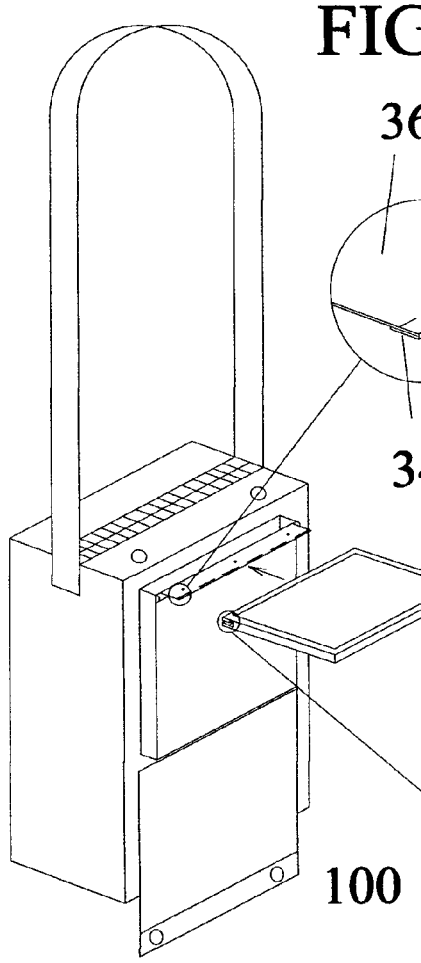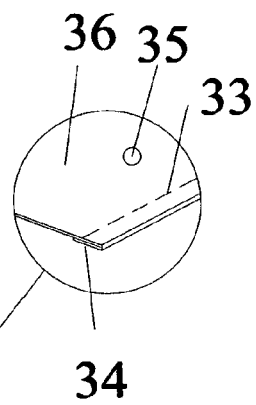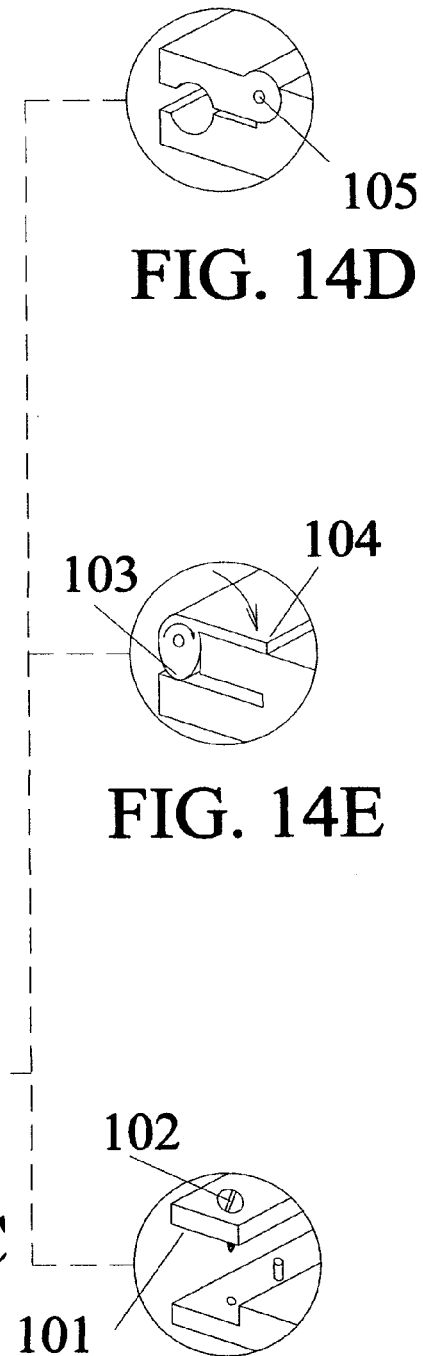
FIG. 14B
FIG. 14D
FIG. 14E
FIG. 14A  FIG. 14C
FIG. 14F

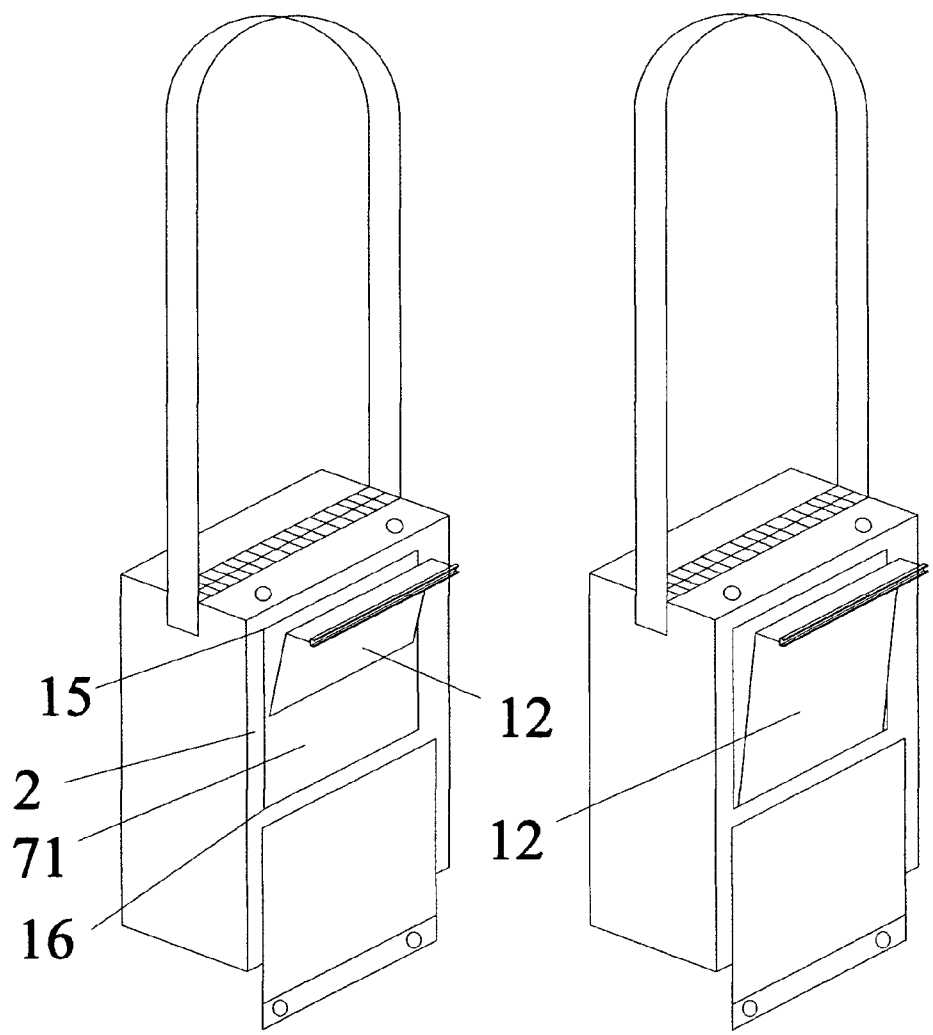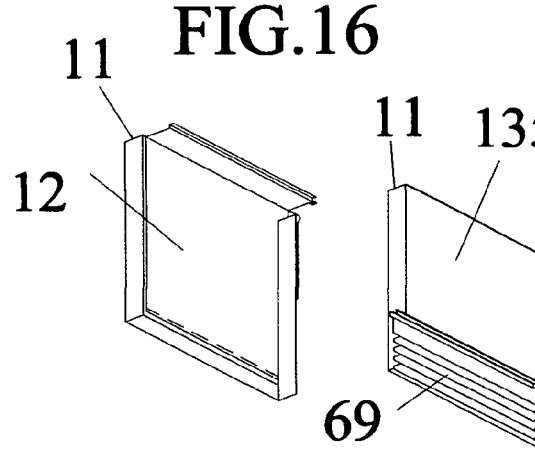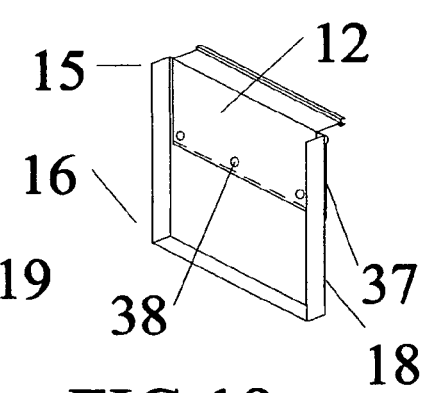

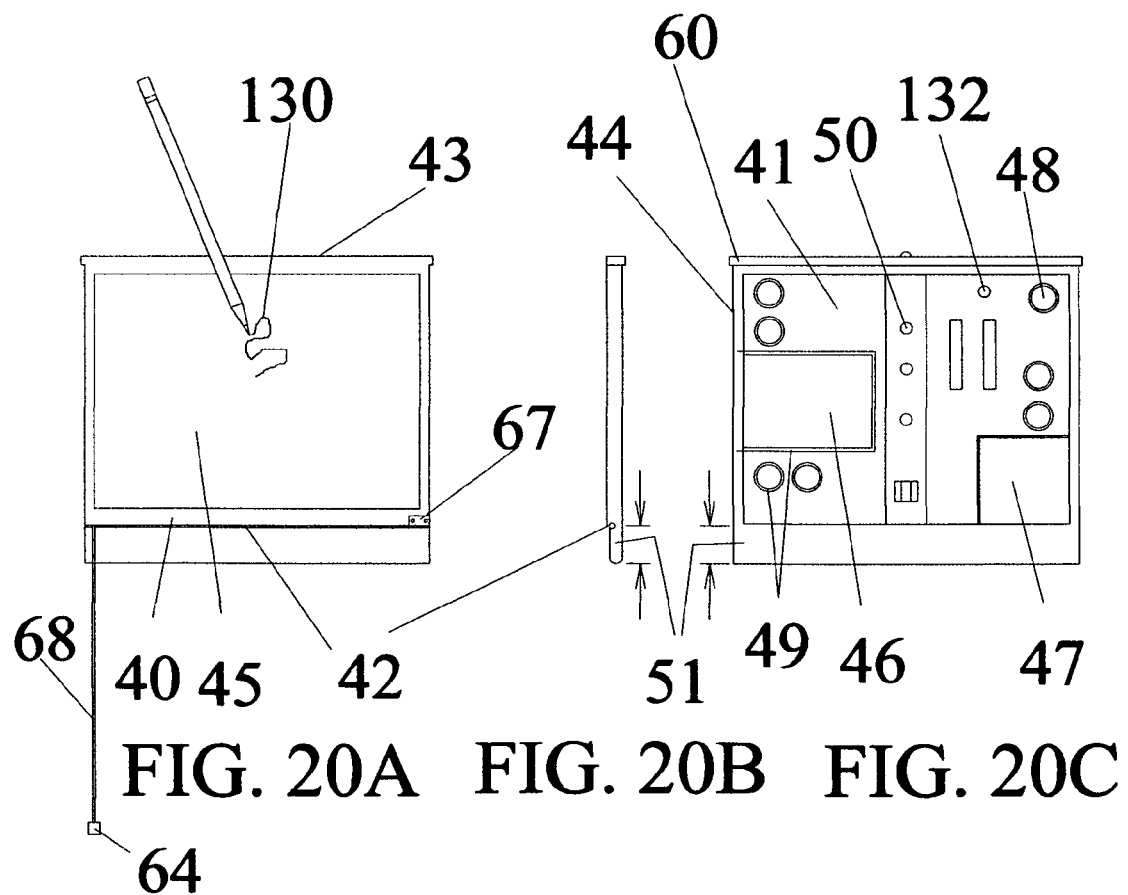

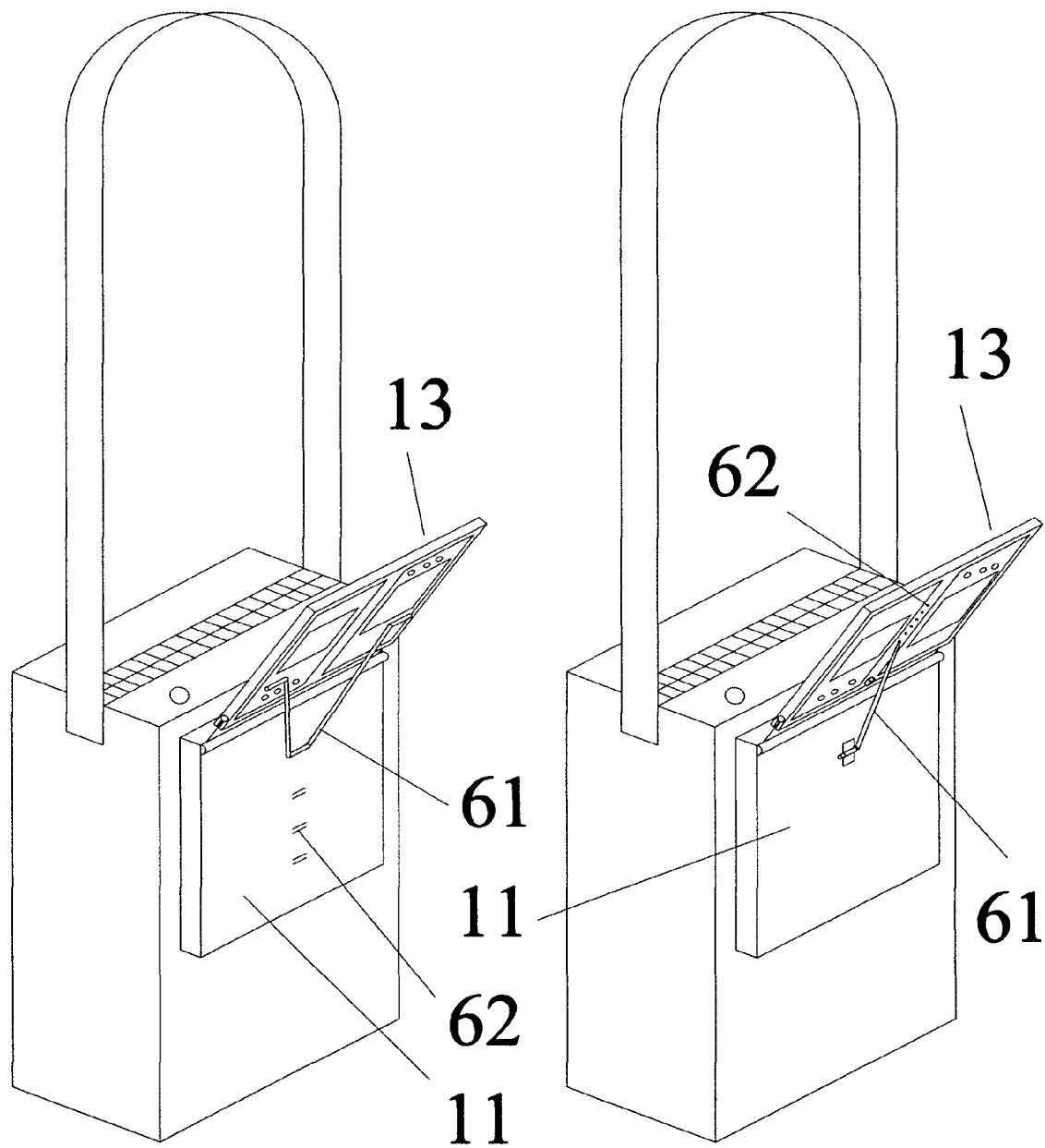

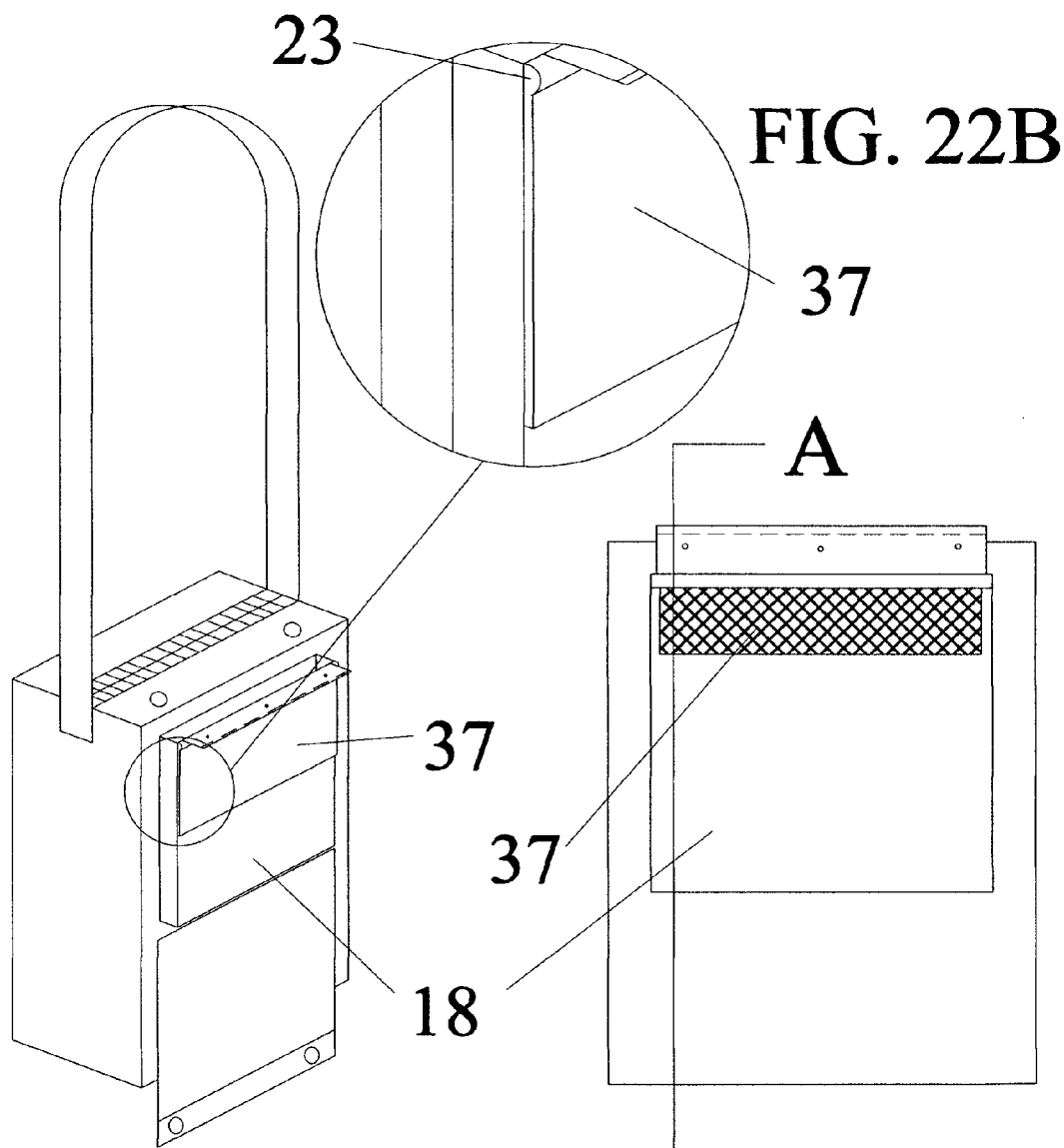
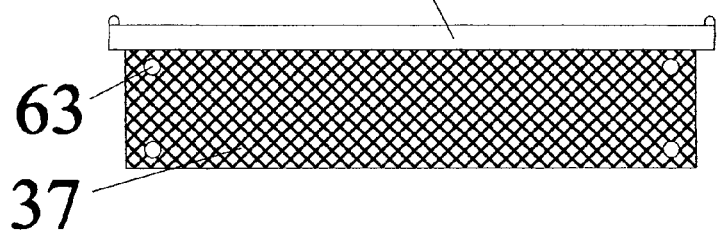
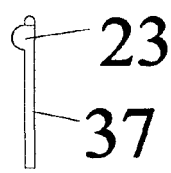

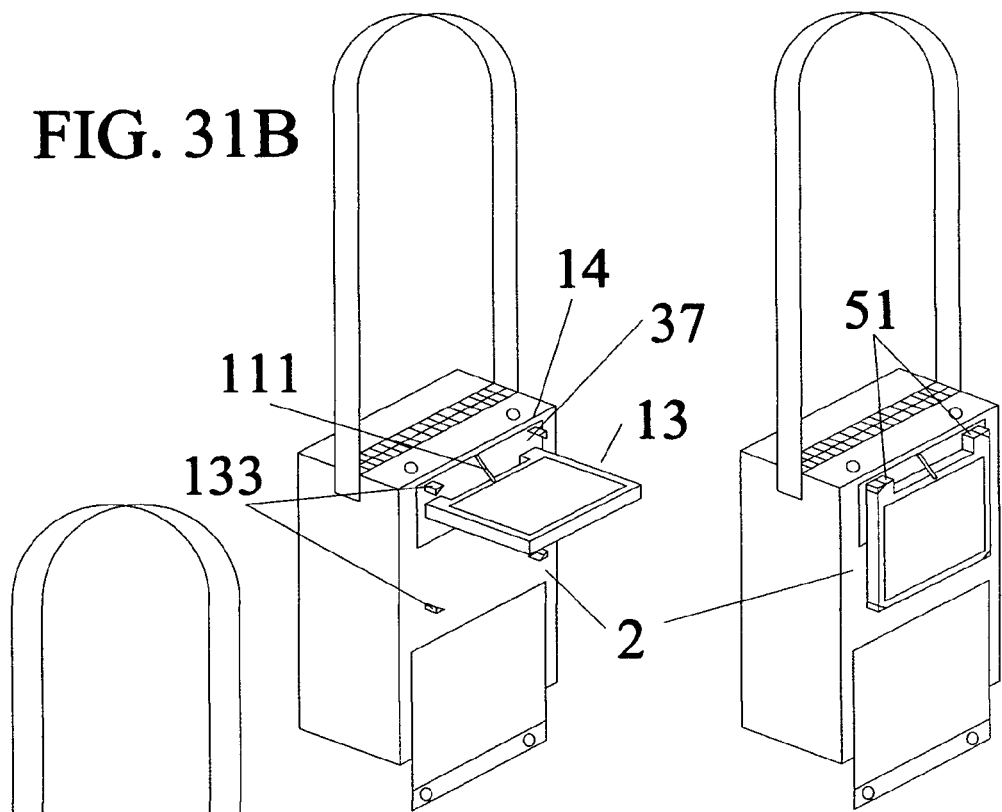
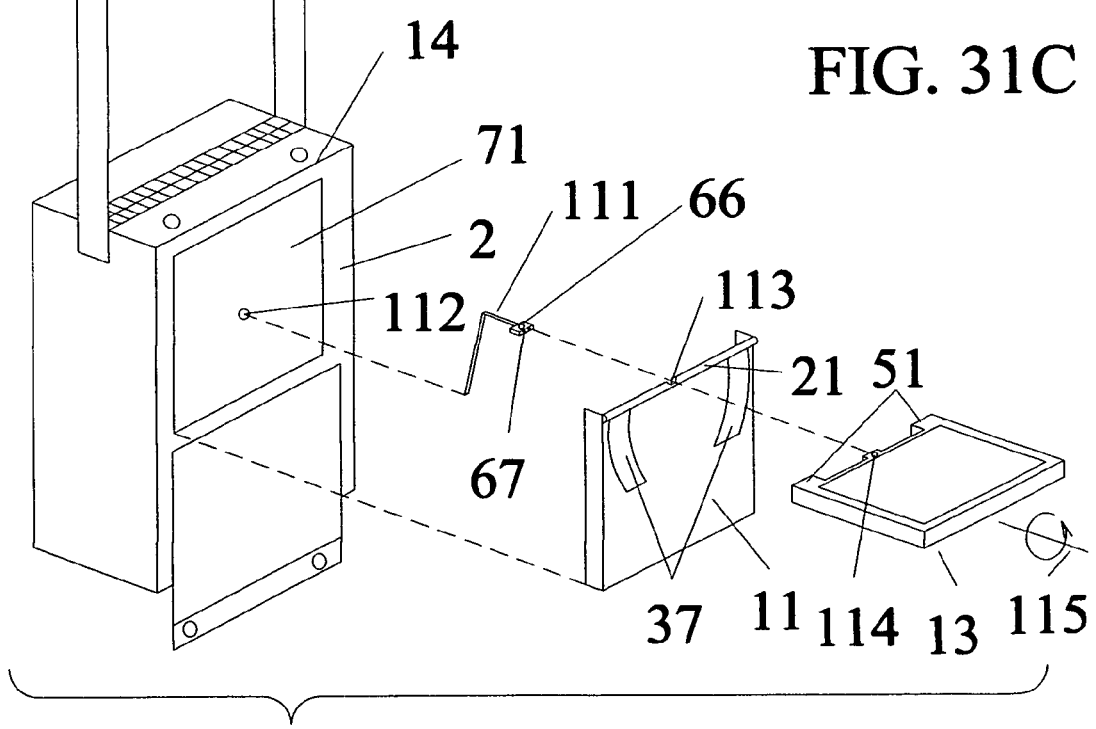

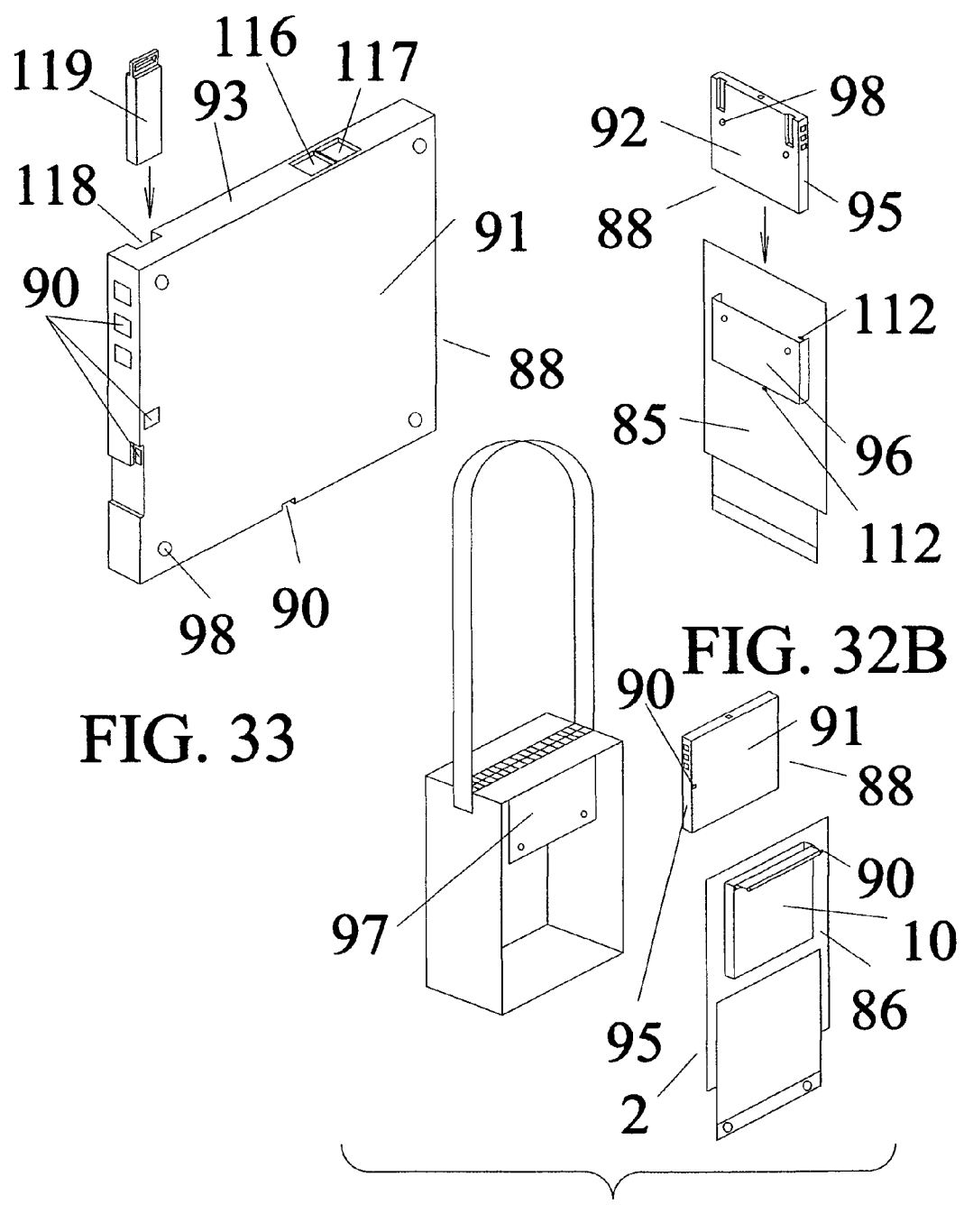

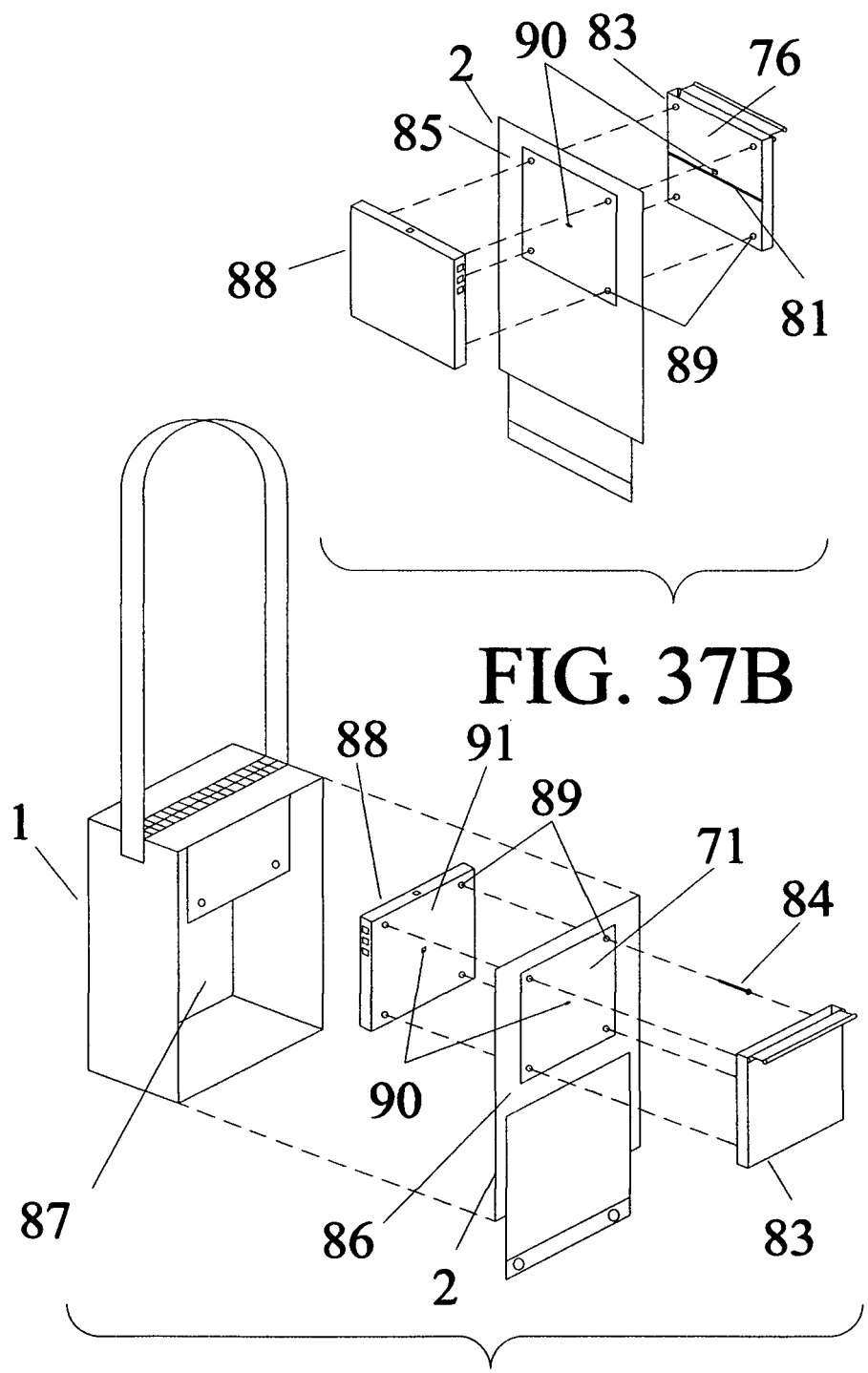

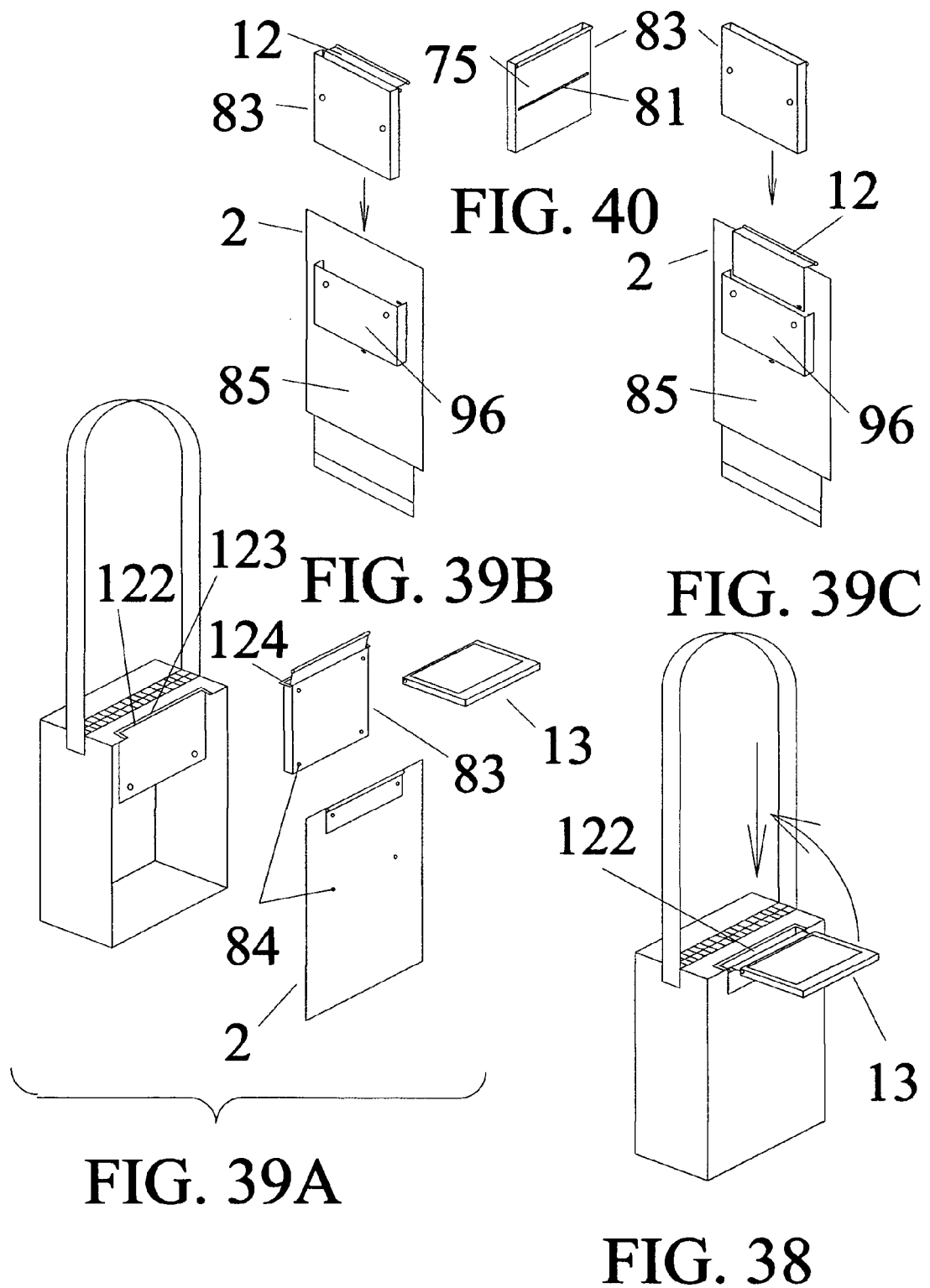

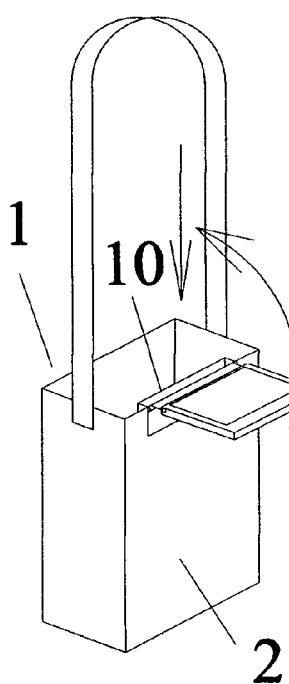
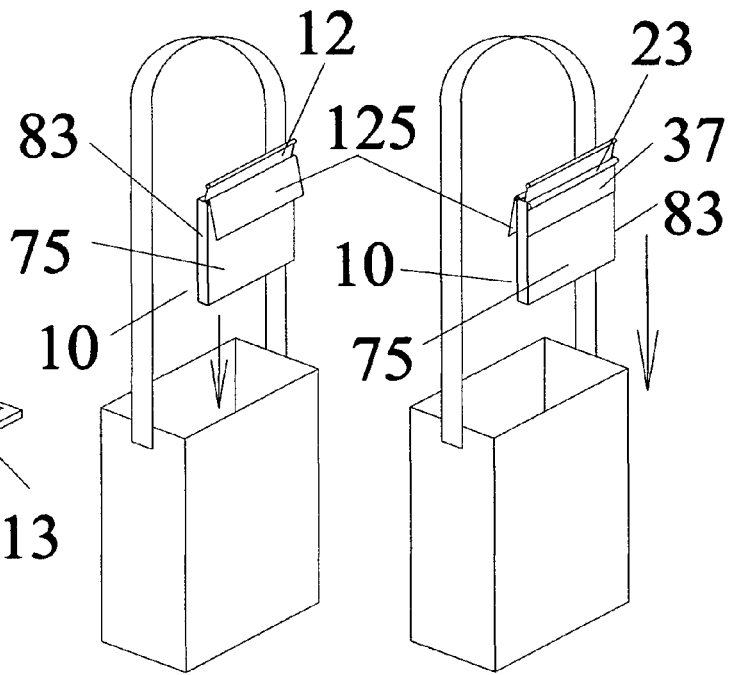
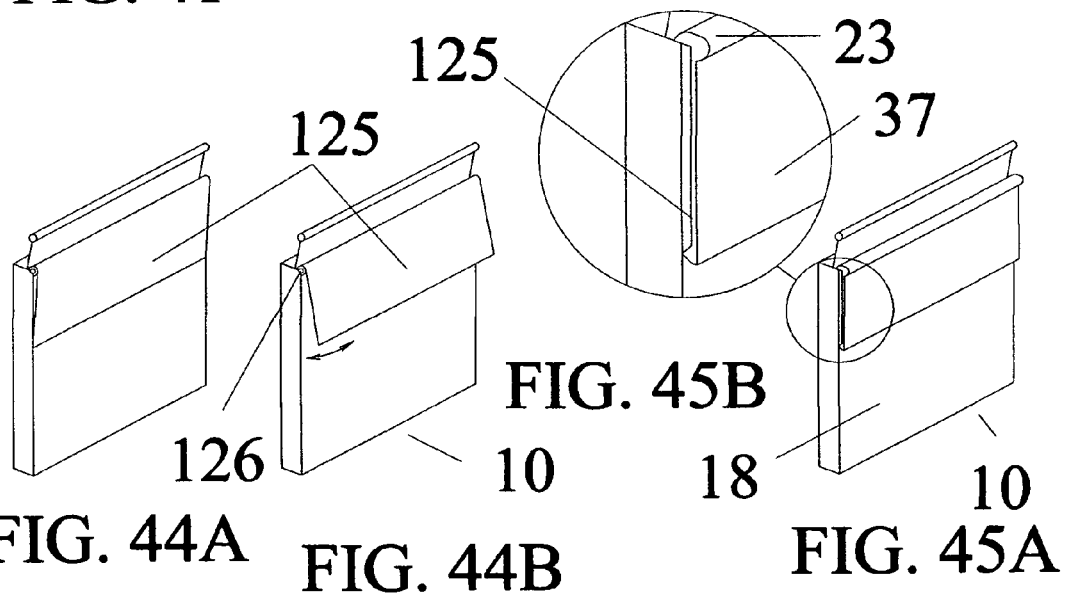
FIG. 41  FIG. 42  FIG. 43
FIG. 44A  FIG. 44B  FIG. 45B  FIG. 45A

BAG COMPUTER SLIDING DEPLOYMENT DISPLAY PANEL ASSEMBLY

CROSS-REFERENCE TO RELATED APPLICATIONS

This application is a Continuation-In-Part of U.S. copending patent application Ser. No. 12/927,884, filed on Nov. 30, 2010. The disclosure of this U.S. patent application is incorporated herein by reference.

This application claims the filing benefit under 35 U.S.C. §119(e) of U.S. Provisional Application No. 61/457,761 filed on May 31, 2011, the entire teachings of which are incorporated herein by reference.

TECHNICAL FIELD

The present invention relates to a computer designed for mobile use.

BACKGROUND OF THE INVENTION

The use of computers has become widespread and computers have replaced may other forms of communication and information storage and retrieval. Access to computers, even while moving about, has become essential to modern life.

Standardization in computer software and some computer components has become important so that computer operation needn't be releamed in every situation. Thus, the standards on a desk top computer are also desired in the mobile environment.

Several obstacles exist in current equipment used for mobile computing: Small displays are not capable of standard Windows operating systems: Small keyboards are not capable of two hand typing: Small computer bodies and surfaces not capable of servicing the necessary computing ability, batteries and input/output electrical connections.

There has been work to miniaturize lap top computers but these attempts are limited by necessary display and keyboard size and, in any case, these computers remain essentially made for use on a table top. A separate carrying case or bag must be used, set up time limits usefulness and separate components can be dropped or left behind.

Pockets with an opening in the top and designed to have an object slide in the top are common. This type of pocket is also commonly found on bags. Novelty may occur when the pocket becomes an opening in the bag top and the opening is designed to have a computing device slide into and out of the opening as in the case of Zheng U.S. Pat. No. 6,769,588. What is needed, though, is a simple and robust means of attaching the computing device to the bag for ready use. Further, eliminating the opening in the bag top will simplify the bag construction and make the interior storage area of the bag more protected from the outside environment.

A computing device, such as a display panel, in this situation would be further improved by having a means to hold the display at various angles so that the wearer of the bag can easily view the display. One example is a prop as explained in U.S. patent application Ser. No. 12/384,952. In a further improvement, the prop may be fixed to the display panel end as in patent application Ser. No. 12/927,884.

The bag computer attempts to solve these problems by mounting computer components on a special bag. The following US patent applications have addressed the design of bag computers:

| publication # | application # |
|---|---|
| 20070201201 | 11/796,920 |
| 20070199844 | 11/799,011 |
| 20090009476 | 12/004,637 |
| 20090009938 | 12/074,115 |
| 20090046416 | 12/216,650 |
| 20080273298 | 12/216,651 |
| 20080192421 | 12/079,753 |
| 20090185342 | 12/383,784 |
| 20090190296 | 12/384,419 |
| 20090141446 | 12/322,282 |
| 20090201637 | 12/384,952 |
| 20090225509 | 12/387,594 |
| 20090225508 | 12/454,327 |
|  | 12/458,917 |
|  | 12/584,304 |

BRIEF DESCRIPTION OF THE INVENTION

This computing device is a bag with a display pivoting near the top of the front wall so that it can be viewed by the bag wearer. In addition, the bag includes a support structures which holds the display panel to the bag and provides safe storage for it when not in use.

The support structure may be pocket-like with an opening toward the top and include a retainer to hold the display panel to the bag while still allowing it to be slid out of the support structure and pivotally hung over the support structure top front edge for use. The support structure top front edge may be reinforced.

The retainer may be an attachment flap and may be removable from the display panel and from the bag. Examples of removable attachments include matching channels, clamp and flap, or axle and bearing. The retainer may include an electrical connection to connect the display panel to a computing unit, batteries or peripherals stored in the interior of the bag.

The retainer may attach to either the bag front next to the support structure or the inside of the support structure.

To allow the display panel to hold various angles relative to the bag front, the support structure may include a prop between the display panel and bag or support structure. Alternatively, the display panel may have a prop fixed to its end and this prop may press against the support structure front while the display panel is suspended by the retainer. A contact surface may be included on the support structure front to assist in holding the prop to the support structure.

The bag may include a computing unit panel and this may be attached to the inside of the bag front wall. There may be an electrical connection to connect the computing unit panel to other electrical equipment on the inside and outside of the bag. The computing unit panel may be held to the bag unit a mounting structure. Instead, the support structure may be rigid and attach through the bag front wall to the computing unit panel to fix the equipment to the bag front.

The support structure may take the form of a rigid protective receptacle meant to mount in a soft holder sewn to the bag front. The receptacle may or may not include the retainer.

The support structure may include a holder that is rigid and meant be mounted directly to the bag front wall. In this case, the holder, on the outside of the bag front wall, may be attached through the bag front wall to a backing plate or computing unit panel on the inside of the bag front wall, clamping the inside and outside equipment together with the bag front wall between. Electrical connection may be included.

Alternatively, the support structure with rigid holder may be attached to the inside of the bag front wall with an opening in the bag top wall allowing the display panel to be inserted into or extracted from the holder. A coupling may be included to seal the holder top end to the bag top wall.

The support structure with display panel may be a self-contained unit meant to be mounted to any object. The holder may include attachments for mounting and the attachments may be a clip for easy mounting. The clip may be found on the front or back holder walls to mounting to the inside or outside of the bag front wall, respectively.

BRIEF DESCRIPTION OF THE SEVERAL VIEWS OF THE DRAWINGS

FIG. 1A This is a view showing the general features of a bag computer with sliding deployment display panel assembly with the display panel in operating position.

FIG. 1B This is a view showing the general features of a bag computer with sliding deployment display panel assembly with the display panel hanging approximately parallel to the bag front wall.

FIG. 3 This drawing shows the bag computer with the display panel in operating position. Dotted lines and arrows show the movement of the display panel from operating position to storage position in the holder.

FIG. 4 This is an exploded view of the bag computer showing parts of the support structure.

FIG. 5 This drawing shown more details of the support structure holder part.

FIG. 6 This is a view of the display panel front side with an attachment flap attached.

FIG. 7 This is a view of the display panel back side with an attachment flap attached.

FIG. 8 This is an attachment flap showing details.

FIG. 9 This is an attachment flap with tapered side edges.

FIG. 10 This is an attachment flap with the side edges tapered to a single point of attachment.

FIG. 11A This shows a bag computer with the attachment flap distal end attachment disconnected from the display panel.

FIG. 11B This is a magnification of the shaped first channel on the attachment flap distal end matching a second channel on the display panel.

FIG. 11C This is a magnification of the shaped second channel on the display panel matching a first channel on the attachment flap distal end.

FIG. 12A This shows a bag computer with the attachment flap distal end attachment disconnected from the display panel.

FIG. 12B This is a magnification of the rope first channel on the attachment flap distal end matching a second channel on the display panel.

FIG. 12C This is a magnification of the tube shaped second channel on the display panel matching a first channel on the attachment flap distal end.

FIG. 13A This shows a bag computer with the attachment flap distal end attachment disconnected from the display panel.

FIG. 13B This is a magnification of the round bar first channel in the hem of the attachment flap distal end matching a second channel on the display panel.

FIG. 13C This is a magnification of the tube shaped second channel on the display panel matching a first channel on the attachment flap distal end.

FIG. 14A This shows a bag computer with the attachment flap distal end attachment disconnected from the display panel.

FIG. 14B This is a magnification of the attachment flap distal end with attachment features matching the display panel clamp.

FIG. 14C This is a magnification of the display panel attachment edge with a clamp with two jaws molded as one piece.

FIG. 14D This is a magnification of the display panel attachment edge with a clamp with two jaws hinged together.

FIG. 14E This is a magnification of the display panel attachment edge with a clamp with two jaws hinged together with one jaw having a cam and lever.

FIG. 14F This is a magnification of the display panel attachment edge with a clamp with two jaws one of which is removable.

FIG. 16 This is the bag computer with the holder removed. The attachment flap can be seen attached the bag front wall half way between the top and bottom of the holder area.

FIG. 17 This is the bag computer with the holder removed. The attachment flap can be seen attached the bag front wall near the bottom of the holder area.

FIG. 18A This drawing shows the attachment flap attached near the bottom of the holder.

FIG. 18B This drawing shows the attachment flap stored in the bottom area of the holder.

FIG. 19 In this drawing, the attachment flap is attached to the holder front about half way between the holder top and bottom ends.

FIG. 20A This is a view of the front side of the display panel, removed from the bag.

FIG. 20B This is a side view of the display panel, removed from the bag.

FIG. 20C This is a view of the back side of the display panel, removed from the bag.

FIG. 21A This drawing shows the display panel being supported at an angle using a prop pivotally attached to the display panel back side.

FIG. 21B This drawing shows the display panel being supported at an angle using a prop pivotally attached to the holder front.

FIG. 22A This is the bag computer with a contact surface attached to the outside of the holder.

FIG. 22B This is magnification of the bag computer contact surface attached to the outside of the holder.

FIG. 23A This is a front view of a contact surface. A top edge reinforcement bar is included.

FIG. 23B This is a side view of a contact surface.

FIG. 24 This view shows the cross section of the bag used for FIGS. 25A to 30B.

FIG. 31A This is an exploded view of the bag computer where the retainer is a filament.

FIG. 31B As shown here with the display panel in operating position, the filament retainer may be used to pivotally attach the display panel to the bag near the junction of the top and front bag walls.

FIG. 31C As shown here with the display panel in storage position against the bag front wall, the filament retainer may be used to pivotally attach the display panel to the bag near the junction of the top and front bag walls.

FIG. 32A This is an exploded view of the bag computer showing the outside of the bag front wall with the computing unit panel included.

FIG. 32B This is an exploded view of the bag computer showing the inside of the bag front wall with the computing unit panel included.

FIG. 33 This is a view of the computing unit panel details.

FIG. 37A This is an exploded view of the bag computer where the rigid holder is attached through the bag front wall to a computing unit panel on the inside of the front wall. This view shows the outside of the bag front wall.

FIG. 37B This is a view of the bag front wall where the rigid holder is attached through the bag front wall to a computing unit panel on the inside of the front wall. This view shows the inside of the bag front wall.

FIG. 38 Here the rigid holder is inside the bag with access through an opening in the bag top wall.

FIG. 39A This exploded view shows the rigid holder and the outside of the front wall.

FIG. 39B This view shows the inside of the front wall with a rigid holder including the attachment flap (retainer).

FIG. 39C This view shows the inside of the front wall with a rigid holder. The attachment flap (retainer) is attached to the front wall.

FIG. 40 This view shows the rigid holder with a slot for passing the attachment flap to the inside of the rigid holder.

FIG. 41 This figure shows a complete self contained support structure and display panel attached to the edge of a bag front.

FIG. 42 This figure shows a support structure with a clip for mounting the support structure to the inside of a bag front wall.

FIG. 43 This figure shows a support structure with a clip for mounting the support structure to the outside of a bag front wall.

FIG. 44A This is the support structure with a spring clip for mounting to an object.

FIG. 44B This is the support structure with the spring clip of FIG. 44A with the clip sprung open.

FIG. 45A This figure shows a support structure with a clip made of one molded piece for mounting to an object.

FIG. 45B This is a magnified view of FIG. 45A showing details of the clip.

DETAILED DESCRIPTION OF THE INVENTION

Figure 2A:
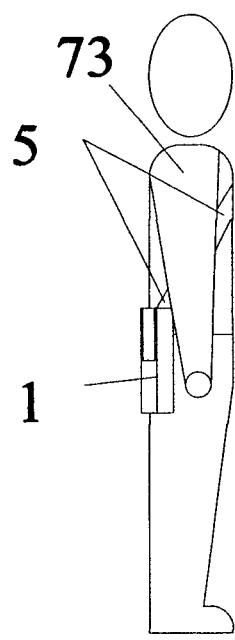
FIG. 2A Here the operator is shown in side view wearing the bag computer with the display panel stored in the support structure.

Shown in FIG. 1A and FIG. 1B, this computer has a bag 1 which may have a front wall 2, a top wall 3, and side walls 4. Each wall has an inside surface and outside surface and the bag walls may enclose a bag interior. The top wall may have an opening 6 to access the interior of the bag and this opening may have a closure such as a zipper, hook and loop or buttons. The bag may have a carrying strap 5 for attaching the bag to the bag wearer and computer operator. The computer has a display panel 13 attached to the bag and configured to deploy by pivoting along a horizontal axis 7 parallel to the bag front wall into various angles relative to the bag front wall and suitable for viewing by the operator. The display panel pivoting is located near the junction 14 of the top and front bag walls. The display panel has a front side 40 and the display 45 is located on the front side of the display panel. Thus, as shown in FIG. 1A, when the display panel is approximately perpendicular to the bag front, the display 45 is facing upward toward the bag wearer and computer operator. The upward direction is from the bottom end of the bag toward the top end of the bag and is illustrated by the upward arrow 131, the downward direction being the opposite direction. Shown in FIG. 1B, when the display panel is hanging downward approximately parallel to the bag front 2, the display 45 is facing away from the bag front wall. When stored, the display panel is located in the computer equipment storage area 71, a portion of the outside surface of the bag front wall, shown here with the support structures filling the majority of this area. When stored in the support structure holder, the display panel's display faces toward the bag front wall. The bag may include one or more heat dissipation outlets 120, sound outlets 121 or a combination of the two and these may be located in the top wall or other bag wall. These align with a computing unit panel mounted in the bag interior and allow heat and sound from it to exit the interior of the bag.

The bag may include a support structure 10 found in the computer equipment storage area. The bag may include a pivoting cover 8, such as a flap or rigid shaped cover matching the computer equipment in the computer equipment storage area. The pivoting cover is attached to the bag near the bottom 9 of the computer equipment storage area and can pivot from an operating position hanging down parallel to the bag front wall to a storage position upward and covering the computer equipment storage area and any equipment in it. The pivoting cover may include matching attachments 70 to hold it in the storage position.

Figure 2B:
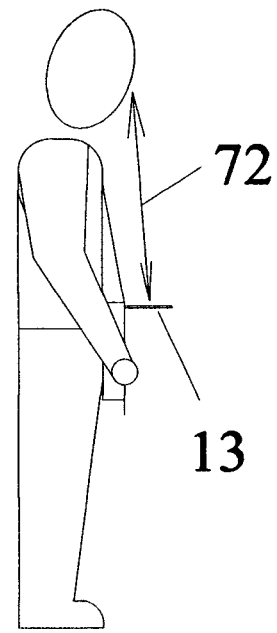
FIG. 2B Here the operator is shown in side view wearing the bag computer and viewing the display panel in operating position.
Figure 2C:
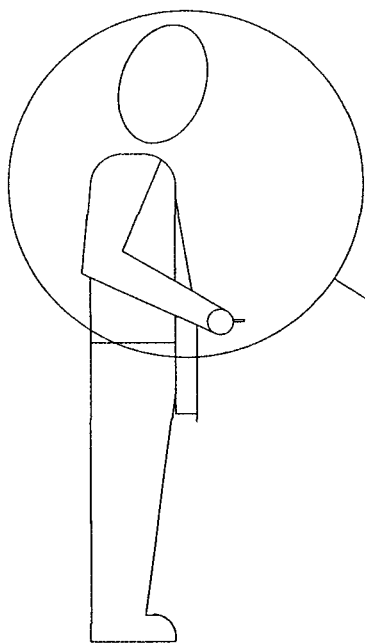
FIG. 2C Here the operator is shown in side view wearing the bag computer and viewing the display panel in operating position while manipulating the controls on the back side of the display panel.
Figure 2D:
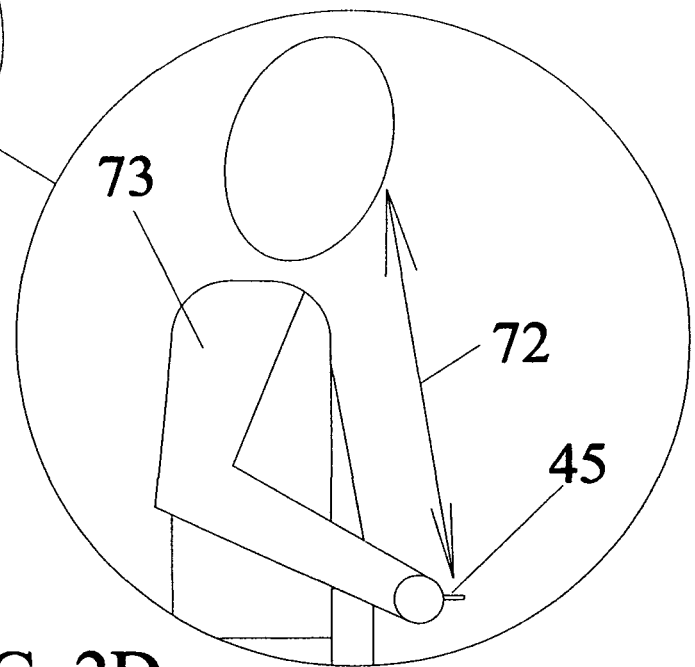
FIG. 2D This is a magnified view of a portion of FIG. 2C.

Shown in FIG. 2A, when the computer is in storage position and not in use, the bag wearer and computer operator 73 can wear the bag 1 by its carrying strap 5 like a normal shoulder bag. When in operating position, for example FIGS. 2B, 2C and 2D, the bag is positioned in front of the operator with the display panel 13 pivoted on the horizontal axis so that the display 45 is in the line of sight 72 of the operator.

As shown in FIG. 3, to deploy the display panel 13 from a storage position into an operating position, the display panel, retained to the bag by a retainer (attachment flap) 12, slides upward out of the storage position in the holder 11 on the bag front wall (display panel shown in dotted lines) and is then pivoted downward into an operating position useful for viewing by the operator.

In the exploded view FIG. 4, the support structure 10 is attached to the outside of the bag's 1 front wall 2. Its purpose includes assisting in storing the display panel to the bag, protecting the display panel when stored, and assisting in deploying the display panel from it storage position to an operating position.

The support structure is located in the computer equipment storage area 71, a portion of the outside surface of the bag front wall, so that when the display panel is moved into operating position it is positioned near the junction 14 of the top and front walls so that the display is as close as possible to the operator wearing the bag and the apparent size of the display is maximized.

The support structure may have a holder 11 part and a retainer part 12. The holder part may be any construction that allows the display panel 13 to slide into and out of the holder from the side closest to the junction of the bag top and bag front walls. The holder front has an outside surface 136.

Shown in FIG. 5, this end is the holder top end 15. The end of the holder distal from the junction of the bag top and bag front walls is the holder bottom end 16. The holder may have side pieces 17 to attach the holder front 18 to the bag.

The holder may be pocket like and may be made of flexible material, such as bag cloth, or it may be made of a rigid material, such as plastic or metal. The holder may be bracket-like or rail-like so that a portion of the display is left exposed.

The bottom end of the holder may be extended so that the holder is longer than the display panel. This produces a volume of space at the bottom of the holder and this area may be used as the bottom end retainer storage area 19 for excess attachment flap material.

The holder has a holder top end opening 20 for the display panel to slide into and out of the holder. The top end of the holder front has a holder top front edge 21. The top end of the holder side pieces has holder top side edges 22.

The top front edge of the holder may include a top front edge reinforcement bar 23 to keep the top front edge straight even under a load, to provide for an axis for the display panel to pivot around and to smoothen the holder top front edge to accommodate an attachment flap, if used. The top side edge may also be reinforced with top side edge reinforcements 24 in such a way to keep the reinforcement bar on the top front edge from collapsing against the front wall and dosing the opening in the top end of the holder. The reinforcement bar may be smooth and rounded and may top edge guides 25 near the top side edges to hold the attachment flap in a proper position, normally in the center of the top front edge.

The retainer part may be made of a flexible material such as a filament, cord, line, strand, wire, belt, electrical cable, strap, chain, sheet, cloth or other flexible fabric. The retainer material should be capable of retaining the display panel to the holder or bag front wall while still being pliable enough to not interfere with the movement of the display panel into and out of the holder. One suitable type of retainer would be an attachment flap and this type of retainer will be used as an example although another type of retainer may be substituted in many cases. An attachment flap is a type of pivoting computer equipment mount, a means to pivotally hold computer equipment, such as a display panel, input device, keyboard, electrical write pad, camera or other equipment, to a bag so that the front and back of the computer equipment is available for use.

Shown in FIG. 6, a front view of the display panel 13 with the attachment flap attached, FIG. 7, a back view of the display panel with the attachment flap attached. In FIGS. 8 and 9, views of the attachment flap without the display panel attached, to keep the display panel from falling out of the holder, the support structure includes a display panel attachment flap 12. The attachment flap may be sheet-like and made of flexible fabric with an attachment flap distal end 26, attachment flap proximal end 27, and two attachment flap side edges 28. The distal end attaches to the display panel. The proximal end attaches to either the bag front or the holder.

The attachment flap should be long enough for the display panel to be fully extracted from the holder yet short enough to position the display panel in a suitable place on the bag front when in operating position outside the holder but not held by the operator.

When ready for use, the attachment flap is located in the interior space of the holder, in other words, between the holder front and the bag front wall. The attachment flap distal end extends out of the holder top end opening for attaching to and operating the display panel. When the display panel is stored inside the holder, the attachment flap is also inside the holder with the display panel.

The attachment flap may be made of a light flexible fabric such as bag material or light weight nylon. The fabric may be of a type that does not stretch in any direction. The attachment flap may include diagonal supports to stop the attachment flap from stretching on the diagonal between the warp and weft of the material.

The attachment flap distal end attaches to the display panel and the attachment flap proximal end attached to either the bag front wall or to the holder. The attachment flap maybe attached to the display panel and/or bag/holder permanently with, for example, riveting, crimping or sewing 29.

The attachment flap may be removably attached to the display panel using complimentary attachment means on the display panel and attachment flap distal end. Similarly, the attachment flap may be removably attached to the bag front wall or to the holder using complimentary attachment means on the bag front wall or holder and on the attachment flap proximal end.

The attachment flap complimentary attachment means may be or may include a clamp or adaptation for clamping such as redoubled hem 30, holes 31. The attachment flap attachment may be a first channel 32, bar 99 or track adapted to match, slide into and hold to a complimentary second channel attachment on the display panel 13, bag front or holder.

FIG. 6 and FIG. 8 show that the attachment flap may include an electrical connection 64, such as a wire with associated openings, channels and plug/sockets, that leads from the display panel to an electrical device such as a computing unit, peripheral or batteries, found inside the bag. The attachment flap may have an electrical access channel 65 built into it. The attachment flap may be made of two layers of material sewn together to form this electrical access channel. One or more electrical access openings 127 may provide entrance to the channel. The attachment flap may have a distal end attachment 66 to match a complimentary attachment on the display panel. The distal end attachment may include a disconnectable electrical connection 67, such as a socket or plug, which matches and connects to an electrical connection on the display panel. The proximal end attachment may also have such an electrical connection. Alternatively, the electrical connection may be a part of the display panel or computing unit panel and the attachment flap may have only the electrical access channel.

FIG. 9 shows that the attachment flap may be shaped or tapered along the side edges 28 to allow the display panel to twist on a horizontal axis perpendicular to the bag front wall while in the operating position and allow the operator to aim the display at his face. Shown in FIG. 10, in the extreme, the sides may meet at the display panel to allow the display panel to swivel with a swivel attachment 134.

FIG. 11B shows a type of first channel attachment 26 on the attachment flap distal end made of shaped metal and a matching second channel attachment 32 on the display panel, shown in FIG. 11C. FIG. 12B shows an example where the first channel attachment on the attachment flap made is a rope or dowel 26 with a matching tube type second channel 32 on the display panel, shown in FIG. 12C. In FIG. 13B the first channel attachment on the attachment flap made is a round cross section bar 26 located in the hem of the attachment flap with the matching second channel on the display panel being a tube type channel 32, shown in FIG. 13C. These are examples and the type of first and second channels may be reversed or may be of different cross section as long as the two channels match and serve to the attach the attachment flap to the display panel. First and second channels may also be used as a means to remove the proximal end of the attachment flap from the bag or holder.

Either channel may include a locking mechanism, teeth, friction surface or other means to keep the first channel attachment from sliding out of the second channel attachment.

Shown in FIGS. 14A and 14B, the attachment flap distal end may be plain to match a clamp on the display panel. The plain fabric 36 attachment flap distal end may have an attachment feature, such as stitching 33, redoubled flap material 34 or holes 35, to assist in clamping to the display panel. The matching display panel may have a clamp adapted to attaching the display panel to the attachment flap. The clamp may be two jaws 100 molded together, FIG. 14C; two jaws hinged 105 together, FIG. 14D; two hinged jaws with a rotating cam type clamp 103 with actuation lever 104, FIG. 14E; two jaws where one jaw is removably attached with a fastener 102 holding the two jaws together, FIG. 14F.

For the attachment flap proximal end, a clamp and matching fabric between the attachment flap and bag or holder may be used in a way similar to described above.

Figure 15:
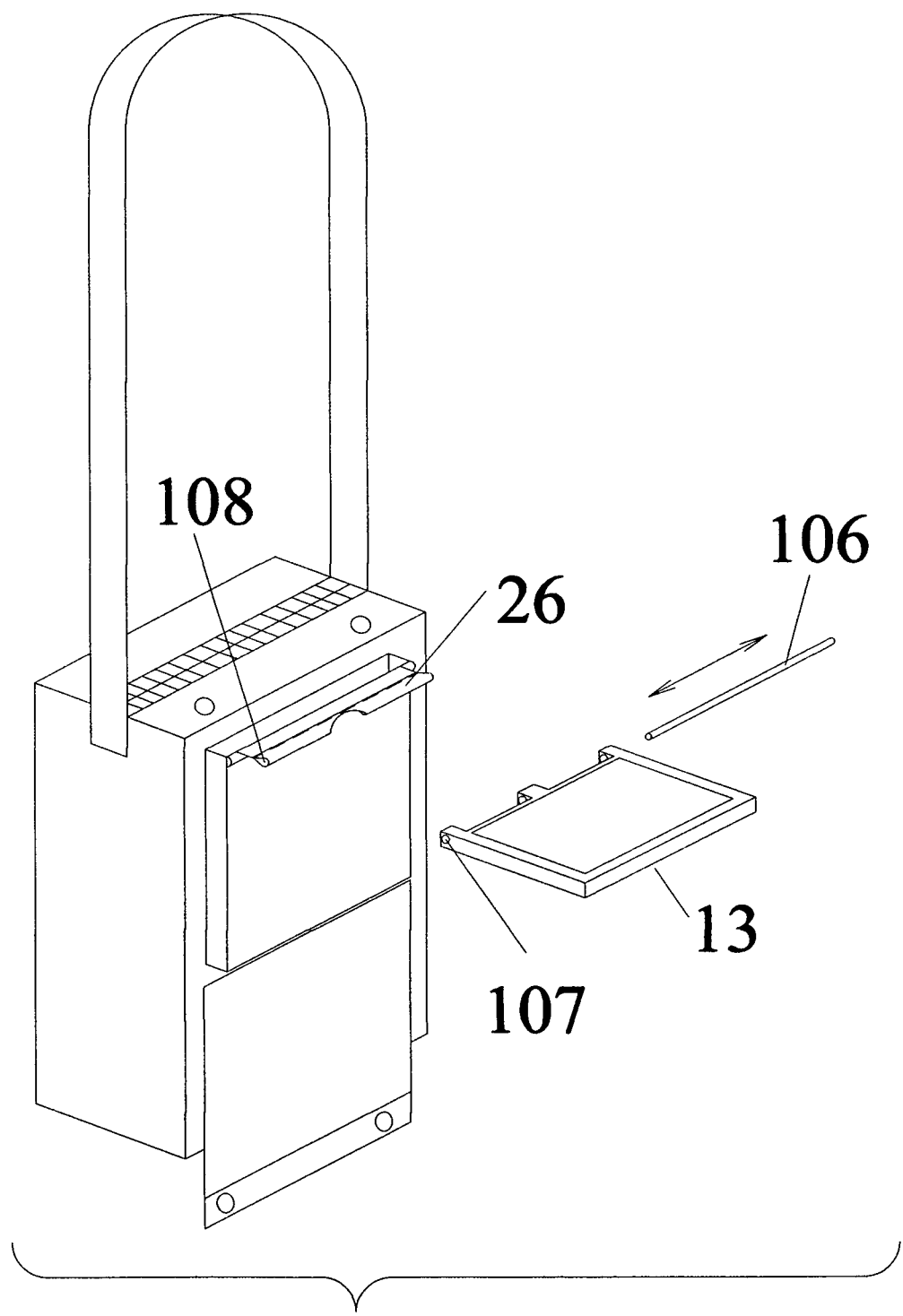
FIG. 15 This shows a bag computer with the attachment flap distal end attachment disconnected from the display panel. The attachment means includes an axle connecting bearing on the display panel with bearings on the attachment flap.

Show in FIG. 15, the attachment flap distal end 26 may be attached to the display panel 13 using an axle. The axle 106 may be removable and designed to pass through bearings on the display panel and on the attachment flap thus attaching them. In this case, the display panel bearings are holes 107 in the display panel along the horizontal axis and the attachment flap bearings are formed by a hem 108 in the attachment flap material.

For the attachment flap proximal end, one or more axles or bearings connecting the attachment flap and bag or holder may be used in a way similar to described above.

Shown in FIGS. 16 and 17 with the holder removed, the attachment flap proximal end may be anchored to the bag front wall 2 in the computer equipment storage area 71 about half way between the holder top end 15 of the support structure and bottom end 16 of the support structure. When the display panel is stored, the attachment flap 12 is approximately parallel to the bag front and in the bottom half of the holder. When in operating position, the attachment flap is approximately parallel to the front wall and in the top half of the support structure.

The attachment flap proximal end may be attached to the bag front wall about half way between the holder's top end and bottom end, shown in FIG. 16. This minimizes the about of attachment flap material while still allowing the display panel to be fully inserted into and extracted from the holder. Attaching the attachment flap to the bag in this location facilitates an electrical connection leading from a computing unit panel inside the bag, through the bag front wall, through the attachment flap to the display panel.

Alternatively, as shown in FIGS. 17, 18A and 18B, the attachment flap proximal edge may be anchored near the bottom end of the support structure to either the bag front wall 2 or the inside surface 135 of the holder 11. In this case, there will be extra attachment flap material when the display panel is stored in the holder. This material may be stored in the bottom end retainer storage area 19. The extra material may be pleated 69 to facilitate storage.

Shown in FIG. 19, the attachment flap's line of attachment may coincide with the placement of a rigid contact surface 37 fixed to the outside surface of the holder front 18. This would place the attachment flap attachment about half way between the top end 15 and bottom end 16 of the holder front. The attachment may include riveting 38, screwing or other attachment means through the holder front to the rigid contact surface. The contact surface can then supply a rigid compression column to resist bunching of soft material holder front between the attachment flap attachment line and the holder top front edge. This keeps the attachment flap column of a constant length and makes the angular adjustment of the display panel most precise.

The holder or bag front wall may include an attachment to match the attachment flap proximal end attachment to allow removable connection of the attachment flap to the bag or holder.

The display panel, shown in FIGS. 20A, 20B, and 20C, is panel-like and has a front side 40, a back side 41, a proximal attachment edge 42, a distal edge 43, and two side edges 44. The display panel may be shaped and sized to fit the inside of a holder, rigid holder or holder receptacle for storage. A display 45 is located on the front side of the display panel. The front side of the display panel may include a touch screen control 130 (indicated by pencil drawing line). The back side of the display panel may include controls such as a touch pad 46, pointing device 47 or buttons 48. The back side may include finger guides 49 to help the operator find controls on the back side. The finger guides may be removable. The display panel back side may also include a prop or prop fixtures 50 designed to hold an angle between the display panel and bag front by placing a prop between them. The display panel prop 51 may take the form of an extension of the display panel. This prop/extension may be fixed to the attachment edge of the display panel and may be on the same plane as the plane of the display panel or may be angled relative to the plane of the display panel.

The distal edge of the display panel may include a handle or ledge 60 which may serve to keep the display panel from entering the holder too far and assist in extracting the display panel from the holder.

The display panel may have an electrical connection 64 to connect it with a computing unit panel, peripheral or batteries inside the bag. The connection may be a wire 68 long enough to reach through the attachment flap electrical access channel through the front wall to the inside of the bag. Alternatively, the display panel may include a disconnectable electrical connection 67, such as a socket or plug, designed to match and electrically connect with an electrical connection fixture on the attachment flap distal end.

The attachment flap may be attached to the display panel on or near the display panel proximal attachment edge. If the display panel includes a prop extending from the attachment edge for holding the display panel angle, the attachment edge may not be on an edge of the display panel. In this case, the attachment edge may be a line of attachment or point of attachment of the retainer to the display panel. The display panel may be removable from the attachment flap. For easy removal, the display panel may have an attachment on or near its proximal attachment edge to match and connect with the attachment on the attachment flap distal end.

For privacy, the operator may want to blacken the display panel when it is not in use and hanging down in front of the bag. The display panel may include an electrical down position on/off switch 132 to turn off the display when the display panel is in the vertical down position in front of the bag. The switch may be a button or lever located on the display panel so that it is actuated by pressing against the bag or holder when the display panel is in the vertical position. The switch may be a gravity switch which senses and is actuated when the display panel is in the vertical position.

To control and hold an angular position of the display panel relative to the bag front wall, the bag computer may include one or more propping fixtures. The propping fixtures may be or include a prop, prop bar, prop receptacle, prop base, or a contact surface.

Shown in FIG. 21A, the back side of the display panel 13 may include one or more receptacles 62 adapted to match a prop 61 mounted on the outside of the holder 11 and extending between the bag/holder and the display panel. Shown in FIG. 21B, the back side of the display panel 13 may include prop 61 adapted to match prop receptacles 62 mounted on the holder 11 and extending between the bag/holder and the display panel. The prop may include an angle holding mechanism. In this case the prop may press directly against the holder without receptacles.

FIGS. 22A and 22B show the bag with a contact surface 37 on its front wall. The purpose of the contact surface is to provide a gripping surface adapted to temporarily holding the end of a prop attached to the display panel and thus holding the display panel at various angles relative to the bag/holder front (see also FIG. 25B). The contact surface may be some feature added to and integrated into the outside surface of the holder front 18 such as a rubberized paint, molded in knurling or ribbing, or a sewn on layer of suitable cloth. The contact surface may be a separate feature fixed to the holder front with attachments such as rivets or glue, and may be made of a rigid material such as plastic, which also adds strength to the position of the holder it is attached to. The contact surface may be located on the holder front toward the holder bottom end front the top front edge reinforcement bar 23.

FIG. 23A and side view FIG. 23B show that the top edge reinforcement bar 23 and the contact surface 37 may be united to form a single piece. This combination may have attachments 63 suitable for attachment to the holder front.

FIG. 24 shows the cross section position for FIGS. 25A to 30B.

In FIG. 25A to FIG. 27B, the attachment flap proximal end 27 is attached to the bag front wall about half way between the holder top end and holder bottom end.

Figures 25A, 25B:
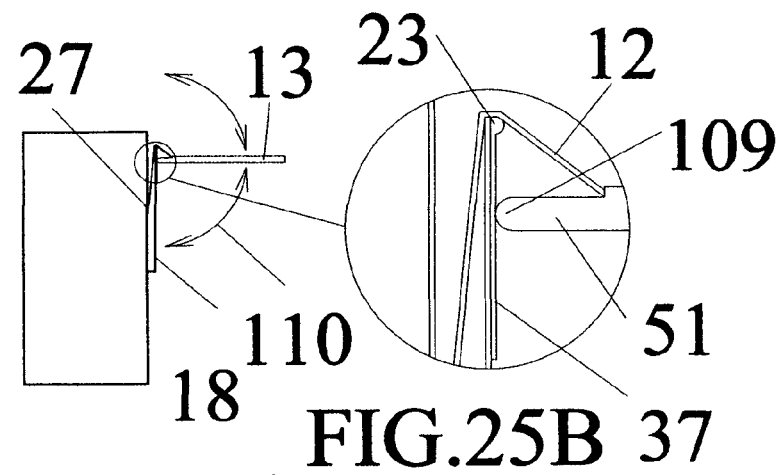
FIG. 25A This is a cross section of the bag computer with sliding deployment display panel assembly and the display panel in operating position.
FIG. 25B This is a magnified view of a portion of FIG. 25A, the propping area of the display panel and support structure.

As shown in side cross section FIG. 25A and magnified in FIG. 25B, the prop may be permanently fixed to the display panel at the attachment edge. In this situation, the prop 51 is also an extension of the display panel. The prop/extension may be on the same plane at the display panel 13 or may form some angle less than 180 degrees between the display panel and the prop/extension. The prop/extension may be used to extend between the bag or holder front and the display panel to hold the display panel in various angles relative to the bag front. In any case, the propping may be ignored and the display panel allowed to lay approximately flat against the bag and holder front.

The holder front 18 may include a contact surface 37. The contact surface provides a rigid surface for the prop/extension end 109 to press against. The contact surface and extension end may each include a gripping feature which temporarily holds the extension and contact surface together. Examples may include rubber, high friction material, hook and loop, teeth, matching features to temporarily hold, ribbing, knurling or socket and pin, to mention a few means.

The angular support assembly forms a triangle with sides including 1) the top front edge reinforcement bar 23 and contact surface 37, 2) the attachment flap 12 and 3) the prop/extension 51. The angles between the sides, and also the angle 110 of the display panel relative to the bag front, may be adjusted by separating the display panel prop/extension end from the contact surface and then replacing it in a new position on the contact surface. The top edge reinforcement bar acts as a pivot point to allow the display panel to pivot from an approximately vertical position when stored to a variety of angles suited for viewing in the line of sight of the operator/wearer of the bag computer.

Figures 26A, 26B:
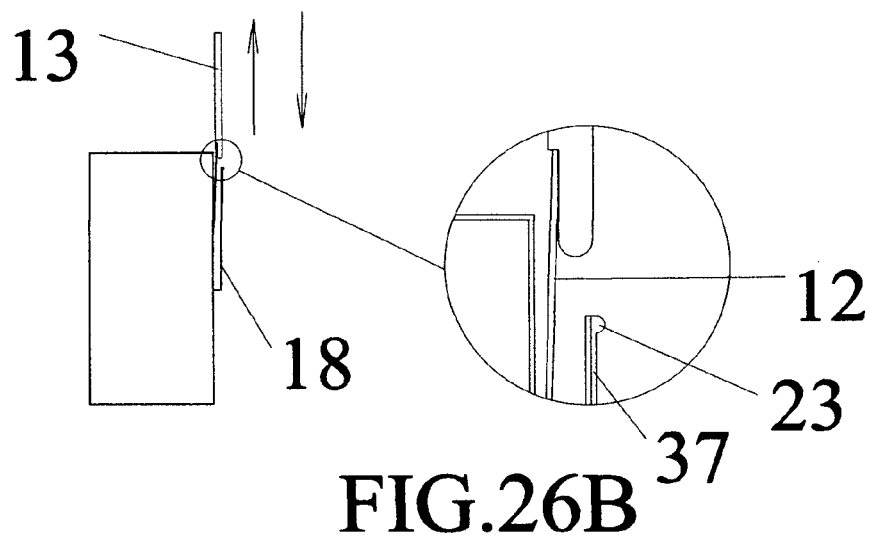
FIG. 26A This is a cross section of the bag computer with sliding deployment display panel assembly and the display panel about to be inserted into the support structure.
FIG. 26B This is a magnified view of a portion of FIG. 26A, the propping area of the display panel and support structure.

Shown in FIG. 26A and magnified in FIG. 26B, to store the display panel 13, it is lifted away from the holder 18, contact surface 37 and reinforcement bar 23 and positioned to insert and slide downward into the holder. The display panel is still attached to the attachment flap 12.

Figures 27A, 27B:
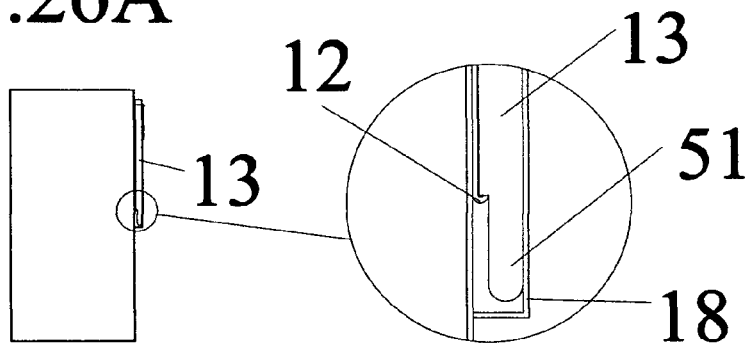
FIG. 27A This is a cross section of the bag computer with sliding deployment display panel assembly and the display panel in the support structure.
FIG. 27B This is a magnified view of a portion of FIG. 27A, the display panel prop area in the support structure.

Shown in FIG. 27A and magnified in FIG. 27B, the display panel 13 is stored in the holder 18. The prop/extension 51 of the display panel 13 is nearest the bottom end of the holder and the attachment flap 12 leads up to its connection point about half way between the holder top and bottom ends.

Figures 28A, 28B:
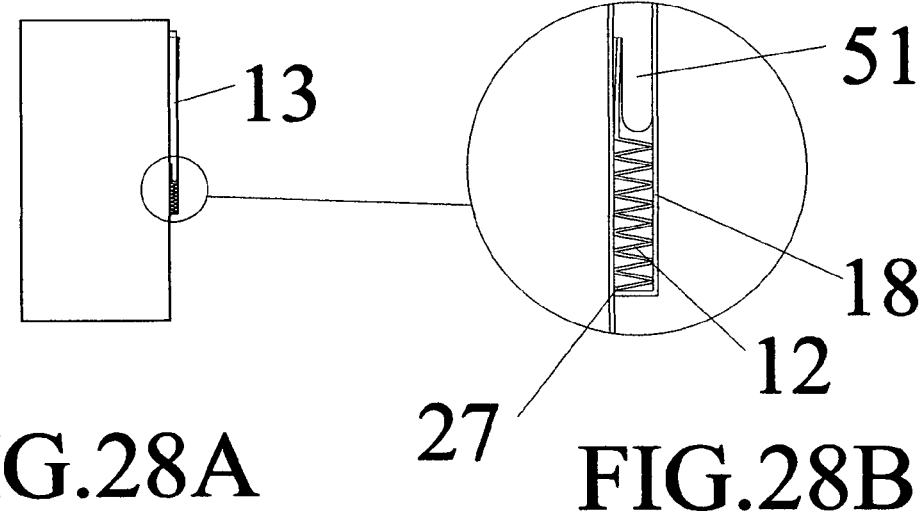
FIG. 28A This is a cross section of the bag computer with sliding deployment display panel assembly with the display panel stored in the support structure.
FIG. 28B This is a magnified view of a portion of FIG. 28A, the display panel prop area in the support structure showing stored excess attachment flap.

In FIG. 28A and magnified in FIG. 28B, the attachment flap proximal end 27 is attached at or near the bottom end of the holder 18. The operation is approximately the same as previously described. When the display panel 13 is stored in the holder, excess attachment flap 12 material may be stored in the bottom end retainer storage area below the prop/extension 51. If the retainer is, for example, an electrical cable, the excess retainer material may be folded in the opposite direction.

Figures 29A, 29B:
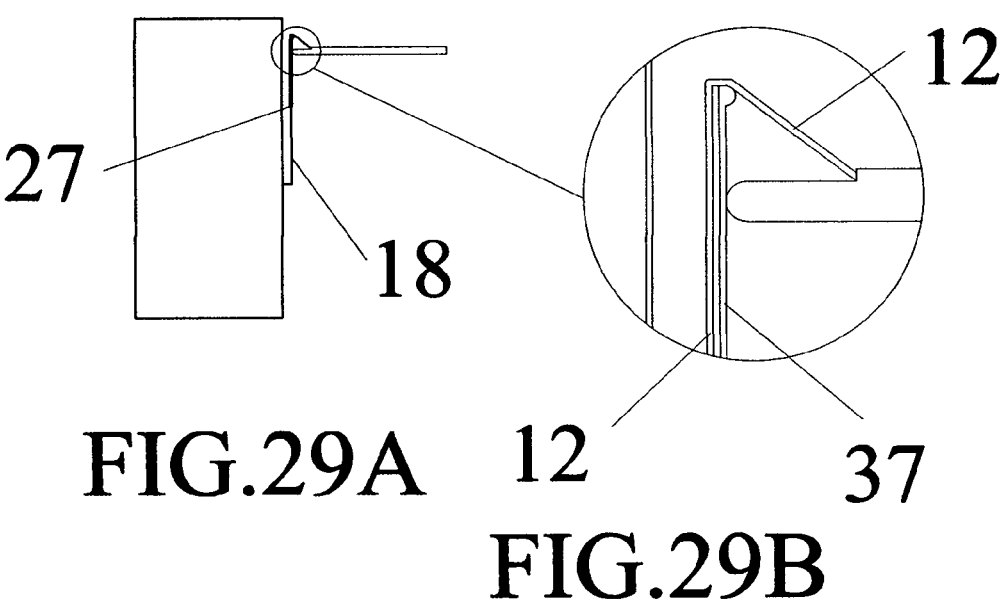
FIG. 29A This is a cross section of the bag computer with sliding deployment display panel assembly and the display panel in operating position. The attachment flap is secured to the inside of the holder front.
FIG. 29B This is a magnified view of a portion of FIG. 29A, the propping area of the display panel and support structure.

In FIG. 29A and magnified in FIG. 29B, the attachment flap proximal end 27 is attached to the inside surface of the holder front 18 opposite the lower end of the contact surface 37 on the outside surface of the holder front. When in operating position, the attachment flap 12 pulls against the contact surface which may be rigid. This precludes the bunching of the holder front material in the case that it is made of flexible material and assures a constant length of the attachment flap found on the outside of the holder.

Figures 30A, 30B:
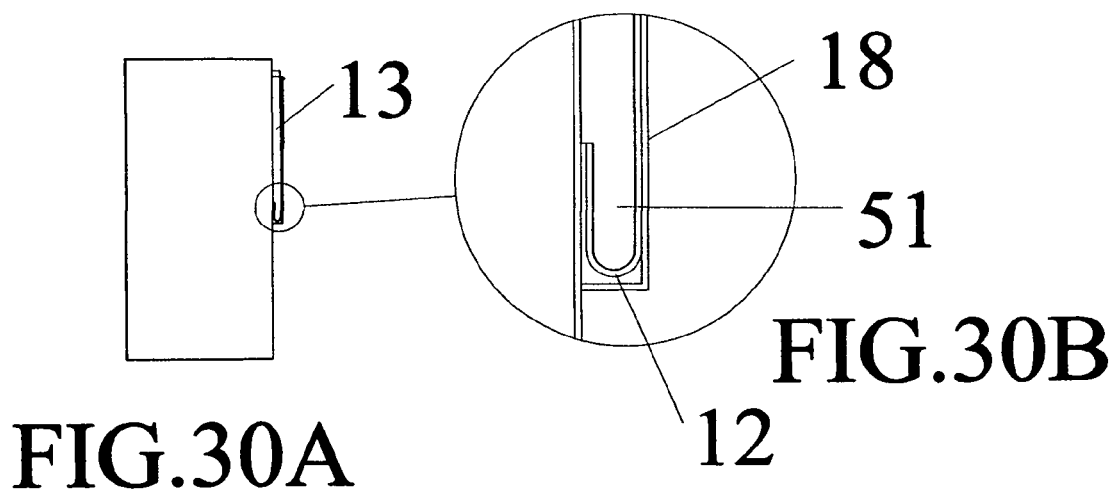
FIG. 30A This is a cross section of the bag computer with sliding deployment display panel assembly and the display panel in the support structure. The attachment flap is secured to the inside of the holder front.
FIG. 30B This is a magnified view of a portion of FIG. 30A, the display panel prop area in the support structure.

Shown in FIG. 30A and magnified in FIG. 30B, when the display panel 13 is stored in the holder 18 the prop extension end is used to push the attachment flap into the holder. In storage, the attachment flap 12 leads around the bottom end of the prop/extension 51 and up to its attachment near the lower end of the contact surface.

FIG. 31A shows, in an exploded view, an example where the retainer is a filament or electrical cable 111 instead of an attachment flap. The retainer may attach to the front wall 2 or lead through a front wall opening, such as an electrical access opening 112, to electrical equipment or other retainer anchor in the bag interior. The holder 11 top front edge 21 may include a notch 113 to keep the retainer aligned instead of or in addition to a reinforcement bar. The retainer distal end may have an attachment 66 to match an attachment 114 on the attachment edge (in this case an attachment point) of the display panel 13. The matching attachments may include an electrical connection 67 to connect/disconnect the display panel electrically. The holder front may include a contact surface 37 which may be shaped and/or sized to matched props on the display panel attachment edge and the tracks they may make on the bag or holder front. In this case there are two contact surfaces and two props 51 on the display panel.

The arrangement with the cable or cord allows the display panel to pivot on a second horizontal axis 115 perpendicular to the bag front wall. This movement may serve to assist in aligning the display panel to the line of sight of the operator/wearer when the bag is not hanging straight.

FIGS. 31B and 31C show a reminder that the filament 111 retainer is a type of pivoting computer equipment mount designed to pivotally attach computer equipment, such as a display panel 13, to a bag. In this slightly different arrangement, the display panel is storage on the bag front 2 with its display facing away from the bag front and is deployed by pivoting near the junction of the front and top walls 14 without extracting the display panel from a holder. The display panel props 51 may press against the contact surface 37 as usual to hold an angular position. The bag front may include restraining guides 133, such as corner pieces, footing, cover flap or other means, to keep the display panel from moving or swinging while in storage position.

A computing unit may be included inside the display panel. Alternatively, as shown in FIGS. 32A, 32B, and 33, the computing unit may be located in a separate computing unit panel 88 and included as a component for the bag computer. The computing unit panel may be attached to the inside surface 85 of the front wall and may be positioned and/or shaped to serves as a rigid support for the bag front wall and the computer equipment storage area along with a support structure 10 and/or display panel stored in that area. The computing unit panel has a front side 91 adjacent to the bag's front wall when installed, an opposite back side 92, a top edge 93 nearest the bag's top wall when installed, an opposite bottom edge and two side edges 95.

The computing unit panel may include one or more heat dissipation outlets 116, sound outlets 117 or a combination of the two and these may be located in the top edge. The computing unit panel may also include one or more memory receptacles 118 in the panel and removable memory 119 which fits the receptacle.

The computing unit panel may have one or more electrical connections 90 and/or electrical access openings 112 to electrically connect it with computer equipment attached to the outside of the bag or to peripherals or batteries in the bag interior. The electrical connection may include one or more plugs, sockets, openings, wires, openings, electrical access channels or other means to electrically connect the computer equipment mounted to the inside and outside of the bag.

The computing unit panel may be attached to the inside of the bag front wall using a mounting structure 96, such as a pocket, footing, bracket, pattern of fasteners or other structures or assembly of structures. The mounting structure aligns the computing unit panel with the electrical connections and/or openings through the bag front wall. The mounting structures also positions the computing unit panel so that it may serves as a rigid support for the bag front wall so that the computer equipment storage area 71 (see FIG. 31) on the outside surface 86 of the front wall 2 can resist bulging and/or distortion of the front wall and assist in the storage of the display panel in the computer equipment storage area. The computing unit panel may be shaped to match the shape of the display panel and assist in the storage of the display panel. The mounting structure may include components, such as a flap 97, attached to the top wall of the bag to help distribute the weight of the computing unit panel on the bag. The computing unit panel may include attachments 98 to match the front wall, top wall or mounting structures components.

Figures 34A, 34B:
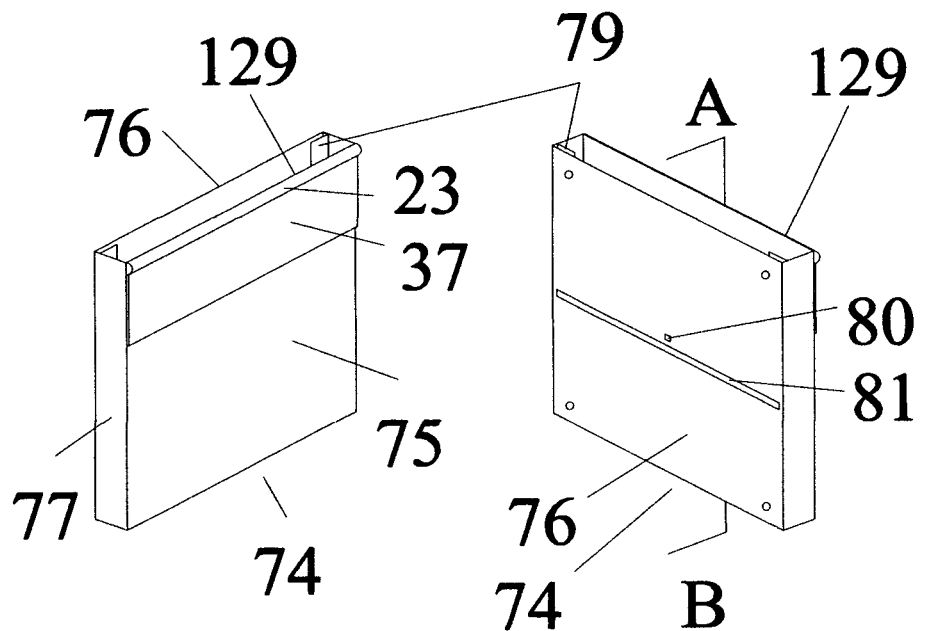
FIG. 34A This figure is the holder receptacle viewed from the front protection wall side.
FIG. 34B This figure is the holder receptacle viewed from the back protection wall side.

Shown in FIGS. 34A and 34B, the support structure may include a holder receptacle 74. The receptacle may be rigid and fit the holder, especially when the holder if a soft fabric pocket. A purpose of the receptacle is to provide protection for the display. The receptacle may include a front protection wall 75 found next to the holder front when installed, a back protection wall 76, side protection walls 77 and a bottom protection wall 78. The front protection wall has a top front edge 129. Each of the walls may have an outside facing surface and an inside facing surface and the walls may form an interior space to hold and protect the display panel and display. The receptacle has an interior space shaped to hold the display panel and an outside form shaped to fit the holder. The interior space may include guides 79 to direct the display panel into the receptacle without scratching the display and these guides may be located on the side walls. The top front edge reinforcement bar 23, located on the top front edge of the front protection wall, and/or the contact surface 37, located on the outside of the front protection wall, may be included in the receptacle. The holder receptacle may include an electrical access opening or electrical connection 80 to connect the display to the bag interior via the attachment flap. The holder receptacle may include a retainer access opening 81, such as a slot or hole, in the back protection wall to allow the attachment flap or other retainer attached to the bag to pass to the inside of the retainer during installation of the receptacle. Cross section AB, shown in side view in FIG. 35, shows that the attachment flap may alternatively be attached to the inside of the holder receptacle 74 using an attachment flap proximal end attachment 82, such as a clamp, clip, screw or other arrangement.

Figures 35, 36:
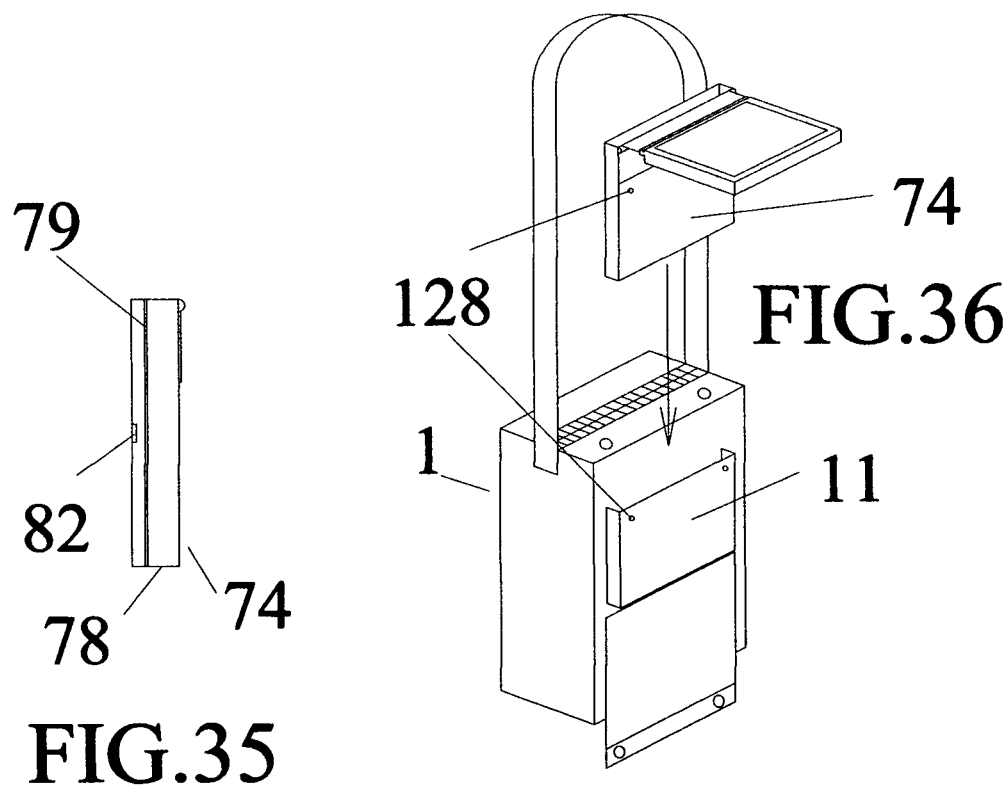
FIG. 35 This is a side view of the holder receptacle.
FIG. 36 This view shows how the receptacle can be inserted into a holder on the bag front.

Shown in FIG. 36, holder receptacle 74 may be inserted into a holder 11 attached to the bag 1 front. The holder and holder receptacle may have complimentary attachments 128 to keep the receptacle in the holder.

The support structure may include a rigid holder. The rigid holder may have the many of the same attributes as the holder receptacle. However, the rigid holder may be attached directly to the bag instead of having a separate holder. FIGS. 34A and 34B, illustrating the holder receptacle, also depict the rigid holder and the features in those drawings may be used to define the parts of the rigid holder. Shown in FIGS. 37A and 37B, the rigid holder 83 may be designed to be attached to the outside surface 86 of the bag front wall with one or more holder-to-bag attachments 84 such as screws, rivets, clips or other attachment means. These would normally allow removal of the rigid holder to allow renewal of the bag 1. The holder may be attached through the bag front wall and anchored to an inside part, backing plate or computing unit panel 88 attached to the inside surface 85 of the bag front wall. Thus, the holder and computing unit panel may act as a clamp with the bag front wall between. The holder-to-computing unit panel attachment means 89, which holds the holder, bag front and computing unit panel together, may be a combination of attachment devices such as screws, rivets, dips or molded shapes; attachment passages such as holes, grommets or front wall material capable of penetration by an attachment device; and attachment anchors such as accepting sockets or holes for screws, rivets or dips. The computer equipment storage area 71, especially the area around the attachments, may be reinforced with extra material on the inside of outside of the front wall. As with the receptacle, the rigid holder may have a back protection wall 76 or side protection walls and these walls and/or the computing unit panel front side 91 may include gripping features such as teeth, pins or knurling to hold the computer equipment in place against the bag front material.

There may be an electrical connection to connect the display panel via an attachment flap from or through the holder through the bag front wall to the computing unit panel. The electrical connection means 90, then, may be a combination of sockets, plugs, access opening or other means to allow connection of the display panel and computing unit panel on the interior 87 of the bag. The parts of the electrical connection may be aligned and may locate to coordinate with the positioning of the retainer/attachment flap inside the holder.

The holder may include a retainer access opening 81, such as a slot or hole, in the back protection wall to allow the attachment flap or other retainer attached to the front wall 2 to pass to the inside of the rigid holder. Alternatively, the rigid holder may lack the back protection wall. Because of the rigidity to the front wall provided by the computing unit panel, the back protection wall may not be needed and may be left out to facilitate the passage of the retainer and any electrical connection to the inside of the rigid holder. Attachment may be between the holder side protection wall and the computing unit panel.

As shown in FIG. 38, the holder may be attached to the inside surface of the bag front wall with the holder top opening coinciding with an bag top wall holder access opening 122 so that the display panel 13 may be slid into and out of the holder from outside the bag.

FIG. 39A, an exploded view of the bag computer with a bag top wall holder access opening 122, shows that the rigid holder 83 may have attachments 84 matching the bag front wall 2. The rigid holder may also have a coupling 124 to match a coupling 123 on the bag around the bag top wall display panel opening. The coupling joins and holds the holder to the bag.

FIGS. 39B and 39C show a view of the bag front wall 2 and its inside surface 85. Mounted to the inside surface there may be a mounting structure 96 which is shaped to removably hold the computing unit panel, as described above. In FIG. 39B, the attachment flap 12 is attached inside the rigid holder. In FIG. 39C, the attachment flap is attached to the bag front wall. FIG. 40 shows that the attachment flap may enter the interior of the rigid holder 83 through a retainer access opening 81, such as a slot or hole, in the rigid holder front protection wall 75.

Shown in FIG. 41, the support structure 10 with display panel 13 may be a self contained unit mountable to an object, such as a bag 1 front wall 2 edge. In FIGS. 42 and 43, a complete support structure 10, including the rigid holder 83 and retainer 12, may be removably mounted to a bag or other object with one or more attachments such as an attachment dip 125. The attachment dip may be attached to the holder front protection wall 75, as in FIG. 42, for mounting the support structure to the inside of the bag front wall. In this case, the contact surface 37 and/or holder top front edge reinforcement bar 23 may be included on the rigid holder 83. Alternatively, an attachment clip, or other attachment, may be located on the holder back protection wall, as in FIG. 43, for mounting the support structure to the outside of the bag front wall. If the attachment dip is attached to the holder back protection wall, then the contact surface 37 and/or the holder top front edge reinforcement bar 23 may be built into the holder front protection wall.

FIGS. 44A and 44B show that the dip 125 may be hinged 126 to the rigid holder 83 and may include a spring mechanism to secure the support structure 10 to the bag or other object. In FIG. 45A and magnification 45B, the clip 125 is one molded flexible piece adapted to holding the support structure 10 to the bag or other object. Also shown is a contact surface 37 and/or holder top front edge reinforcement bar 23 built into the attachment clip.

The invention claimed is:

1. An electronic computing device comprising:
a) a bag comprised of an interior and a wall including an inside surface and an outside surface including a computer equipment storage area with a bottom;
b) a display panel comprised of a front side, a back side, an attachment edge and a display;
c) a holder attached to the outside surface of the bag wall and configured to fit the display panel and hold the display panel in the computer equipment storage area while in a storage position, the holder comprised of a top end, a top end opening, and a top front edge; and
d) a retainer attaching the display panel to one of the bag and the holder, wherein the display panel deploys from the storage position into an operating position by sliding upward out of the holder top end opening and pivoting by the retainer on a horizontal axis into the line of sight of an operator.

2. The computing device of claim 1 further comprising a computing unit panel attached to the inside surface of the bag wall.

3. The computing device of claim 2, wherein the holder is rigid and attached to the outside surface of the bag wall using holder-to-computing unit panel attachment means passing from the holder through the bag wall and to the computing unit panel.

4. The computing device of claim 1 further comprising a mounting structure attached to the inside surface of the bag wall, the mounting structure configured to hold a computing unit panel to the inside surface of the bag wall.

5. The computing device of claim 1 further comprising an electrical connection configured to connect the display panel to one of a peripheral, battery and computing unit in the interior of the bag.

6. The computing device of claim 1, wherein the retainer is an attachment flap.

7. The computing device of claim 6 further comprising an electrical access opening in the bag wall and an electrical access channel in the attachment flap, the access opening and access channel configured to pass an electrical connection from the display panel to the interior of the bag.

8. The computing device of claim 1, wherein the retainer is a filament.

9. The computing device of claim 8, wherein the filament is further comprised of an electrical connection configured to connect the display panel to one of a peripheral, battery and computing unit in an interior of the bag.

10. The computing device of claim 1, further comprised of a holder receptacle shaped on the outside to fit the holder and shaped on the inside to fit the display panel, the holder receptacle including a front protection wall and a top front edge.

11. The computing device of claim 10, wherein the holder receptacle is further comprised of a retainer access opening allowing the retainer attached to the bag to pass to an inside of the holder receptacle.

12. The computing device of claim 10, wherein the holder receptacle is further comprised of a top front edge reinforcement bar to reinforce the top front edge of the holder receptacle.

13. The computing device of claim 10, wherein the holder receptacle is further comprised of a contact surface attached to the holder receptacle front protection wall, the contact surface configured to temporarily hold a display panel prop to the holder receptacle.

14. The computing device of claim 10, wherein the holder receptacle is further comprised of one of an electrical access opening and an electrical connection to electrically connect the display panel to one of a peripheral, battery and computing unit in the interior of the bag.

15. The computing device of claim 10, further comprising an attachment holding the holder receptacle to the holder.

16. The computing device of claim 10, wherein the retainer is comprised of flexible fabric and includes a distal end and a proximal end.

17. The computing device of claim 16, wherein the proximal end is attached to one of the computer equipment storage area and the receptacle.

18. The computing device of claim 16, wherein the distal end is attached to the display panel.

19. The computing device of claim 18, wherein the distal end is attached to the display panel attachment edge.

20. The computing device of claim 16, wherein the retainer includes a free section and the display panel includes a prop on the attachment edge.

21. The computing device of claim 20, wherein the retainer extends out of the holder top end opening and over the holder receptacle top front edge, attaches to the display panel and suspends the display panel by the free section between the holder receptacle top front edge and the display panel attachment edge while the prop pushes against the receptacle to temporarily hold the display panel at one or more angles relative to the holder receptacle front protection wall.

22. The computing device of claim 10, wherein the holder receptacle is further comprised of a guide configured to direct the display panel into the holder receptacle without scratching the display.

23. The computing device of claim 1, wherein the holder is further comprised of a reinforcement bar to reinforce the top front edge of the holder.

24. The computing device of claim 1, wherein the holder is further comprised of a holder front.

25. The computing device of claim 24, wherein the holder front is further comprised of a contact surface configured to temporarily hold a display panel prop to the holder.

26. The computing device of claim 1, wherein one of the display panel and holder is further comprised of one of a prop and prop receptacle configured to hold the display panel at one or more angles relative to the bag wall.

27. The computing device of claim 1, wherein the retainer is comprised of flexible fabric and includes a distal end and a proximal end.

28. The computing device of claim 27, wherein the proximal end is attached to one of the bag and the holder.

29. The computing device of claim 27, wherein the holder is further comprised of an inside surface and the proximal end is attached to the holder inside surface.

30. The computing device of claim 29, wherein the retainer proximal end is attached to one-ef the inside surface of the holder about half way between the holder top end and the bottom of the computer equipment storaqe area, allowing the display panel to be fully inserted into and extracted from the holder.

31. The computing device of claim 30, wherein the holder is further comprised of a holder front including an inside surface and the proximal end of the retainer is attached to the inside surface of the holder front.

32. The computing device of claim 27, wherein the distal end is attached to the display panel.

33. The computing device of claim 32, wherein the distal end is attached to the display panel attachment edge.

34. The computing device of claim 27, wherein the retainer includes a free section and the display panel includes a prop on the attachment edge.

35. The computing device of claim 34, wherein the retainer extends out of the holder top end opening and over the holder top front edge, attaches to the display panel and suspends the display panel by the free section between the holder top front edge and the display panel attachment edge while the prop pushes against one of the bag wall and the holder to temporarily hold the display panel at one or more angles relative to the bag wall.

36. The computing device of claim 1, wherein the display panel front side includes a display and the display panel includes one of a touch screen control on the display and a control on the display panel back side.

37. The computing device of claim 1, wherein the retainer is attached to the attachment edge of the display panel.

38. The computing device of claim 1 further comprised of a panel attached to the bag wall and positioned to serve as a rigid support for the computer equipment storage area.

39. The computing device of claim 1, further comprised of a contact surface configured to temporarily hold a display panel prop to the bag.

40. The computing device of claim 27, wherein the proximal end is attached to the computer equipment storage area.

41. The computing device of claim 40, wherein the retainer proximal end is attached to the computer equipment storage area about half way between the holder top end and the bottom of the computer equipment storage area, allowing the display panel to be fully inserted into and extracted from the holder.

42. The computing device of claim 1, wherein the display panel's display is facing toward the outside surface of the bag front wall when in a storage position in the holder.

43. An electronic device comprising:
a) a holder comprised of a holder front, an inside surface, an outside surface, a top end, a bottom end, a top end opening and a top front edge;
b) a display panel comprised of a front side, a back side, an attachment edge and a display on the front side, wherein the display panel fits the holder; and
c) a retainer attaching the holder to the display panel, the retainer comprised of flexible fabric and includes a proximal end attached to the holder and a distal end, wherein the display panel deploys into an operating position by sliding upward out of the holder top end opening and pivoting by the retainer on a horizontal axis into a line of sight of an operator.

44. The computing device of claim 43, wherein the retainer is an attachment flap.

45. The computing device of claim 43, wherein the retainer is a filament.

46. The computing device of claim 45, wherein the filament is further comprised of an electrical connection configured to connect the display panel to one of a peripheral, battery and computing unit in an interior of the bag.

47. The computing device of claim 43, wherein one of the display panel and the holder is further comprised of one of a prop and a prop receptacle configured to hold the display panel at one or more angles relative to the holder front.

48. The computing device of claim 43, wherein the holder is further comprised of a top front edge reinforcement bar attached to the top front edge of the holder.

49. The computing device of claim 43, wherein the holder is further comprised of a contact surface attached to the outside surface of the holder front, the contact surface configured to temporarily hold a display panel prop to the holder.

50. The computing device of claim 43, wherein the holder is further comprised of an attachment to attach the holder to an object.

51. The computing device of claim 50, wherein the attachment is a clip configured to removably attach the holder to an edge of an object.

52. The computing device of claim 50, wherein the attachment is further comprised of a contact surface.

53. The computing device of claim 43, further comprised of a bag comprised of a front wall including an inside surface and an outside surface and a top wall including a holder access opening, wherein the holder is attached to the inside surface of the bag front wall and the display panel slides into and out of the holder through the holder access opening.

54. The computing device of claim 43, wherein the proximal end is attached to the holder inside surface.

55. The computing device of claim 54, wherein the retainer proximal end is attached to the inside surface of the holder about half way between the holder top end and holder bottom end allowing the display panel to be fully inserted into and extracted from the holder.

56. The computing device of claim 43, wherein the retainer distal end is attached to the display panel.

57. The computing device of claim 56, wherein the distal end is attached to the display panel attachment edge.

58. The computing device of claim 43, wherein the retainer includes a free section and the display panel includes a prop fixed to the attachment edge.

59. The computing device of claim 58, wherein the retainer extends out of the holder top end opening and over the holder top front edge, attaches to the display panel and suspends the display panel by the free section between the holder top front edge and the display panel attachment edge while the prop pushes against the outside surface of the holder to temporarily hold the display panel at one or more angles relative to the holder front.

60. The computing device of claim 43, wherein the display panel front side includes a display and the display panel includes one of a touch screen control on the display and a control on the display panel back side.

61. The computing device of claim 43, wherein the holder is further comprised of a guide configured to direct the display panel into the holder without scratching the display.

62. The computing device of claim 43, wherein the retainer is attached to the attachment edge of the display panel.

* * * * *